United States Patent
Liu et al.

(10) Patent No.: US 7,925,656 B2
(45) Date of Patent: Apr. 12, 2011

(54) NODE LEVEL HASH JOIN FOR EVALUATING A QUERY

(75) Inventors: Shaorong Liu, Evanston, IL (US); Edison L. Ting, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 12/044,451

(22) Filed: Mar. 7, 2008

(65) Prior Publication Data

US 2009/0228514 A1 Sep. 10, 2009

(51) Int. Cl.
*G06F 17/30* (2006.01)
(52) U.S. Cl. ......... 707/747; 707/714; 707/715; 707/716
(58) Field of Classification Search .................. 707/713, 707/714, 715, 716, 747
See application file for complete search history.

(56) References Cited

U.S. PATENT DOCUMENTS

| | | | |
|---|---|---|---|
| 7,085,769 B1 | 8/2006 | Luo et al. | |
| 7,165,063 B2 * | 1/2007 | Beyer et al. | 707/E17.13 |
| 2004/0010752 A1 * | 1/2004 | Chan et al. | 715/513 |
| 2005/0021503 A1 | 1/2005 | Chiang | |
| 2005/0222965 A1 | 10/2005 | Chaudhuri et al. | |
| 2006/0117036 A1 * | 6/2006 | Cruanes et al. | 707/100 |
| 2006/0218176 A1 | 9/2006 | Sun Hsu et al. | |
| 2006/0235839 A1 * | 10/2006 | Krishnaprasad et al. | 707/4 |
| 2006/0288030 A1 | 12/2006 | Lawrence | |
| 2007/0043696 A1 * | 2/2007 | Haas et al. | 707/2 |
| 2007/0174242 A1 | 7/2007 | Josifovski et al. | |
| 2007/0198479 A1 | 8/2007 | Cai et al. | |
| 2007/0233439 A1 | 10/2007 | Carroll et al. | |
| 2007/0250471 A1 | 10/2007 | Fontoura et al. | |

OTHER PUBLICATIONS

Koudas et al., "Data Stream Query Processing", AT&T Labs-Research, Sep. 17, 2003, pp. 1-121.
Schneider et al., Tradeoffs in Processing Multi-Way Join Queries via Hashing in Multiprocessor Database Machines, Computer Sciences Department, University of Wisconsin, 31 pages.
Tok et al., "Twig'n Join: Progressive Query Processing of Multiple XML Streams", School of Computing, National University of Singapore, Sep. 2007, pp. 1-19.

* cited by examiner

*Primary Examiner* — Vincent Boccio
*Assistant Examiner* — Thuy (Tiffany) Bui
(74) *Attorney, Agent, or Firm* — Stephen J. Walder, Jr.; Elissa Y. Wang

(57) ABSTRACT

Markup language node level hash join operations for evaluating a query language query are performed. The markup language node level hash join mechanism, i.e. the "XHash-Join" operator, is a multi-way join operator that uses two hash tables, BUILD and PROBE, to intersect document nodes from multiple index scans and to buffer intermediate query results. The BUILD hash table stores document nodes matching the predicates of a query, and buffers document nodes satisfying extraction nodes, of each portion of the query up to a current portion of the query being evaluated. The BUILD hash table and the PROBE hash table are switched at each portion of the query being evaluated. Query results are generated by linking document nodes buffered in the BUILD hash table based on the semantics of each extraction node.

23 Claims, 20 Drawing Sheets

FIG. 1
```
<?xml version="1.0" encoding="ISO-8859-1"?>
<bookstore>
<book category="COOKING">
        <title lang="en">Sly Chef</title>
        <author>Barry Jenson</author>
        <year>2005</year>
        <price>15.00</price>
</book>
<book category="CHILDREN">
        <title lang="en">Harry Potter and the Chamber of Secrets</title>
        <author>J K. Rowling</author>
        <year>2005</year>
        <price>29.99</price>
</book>
<book category="WEB">
        <title lang="en">XQuery Basics</title>
        <author>James Peach</author>
        <author>Michael Orange</author>
        <author>Phillip Apple</author>
        <author>Jerry Cumquat</author>
        <author>Mary Pear</author>
        <year>2003</year>
        <price>49.99</price>
</book>
<book category="WEB">
        <title lang="en">Learn to XML</title>
        <author>John Grape</author>
        <year>2003</year>
        <price>39.95</price>
</book>
</bookstore>
```

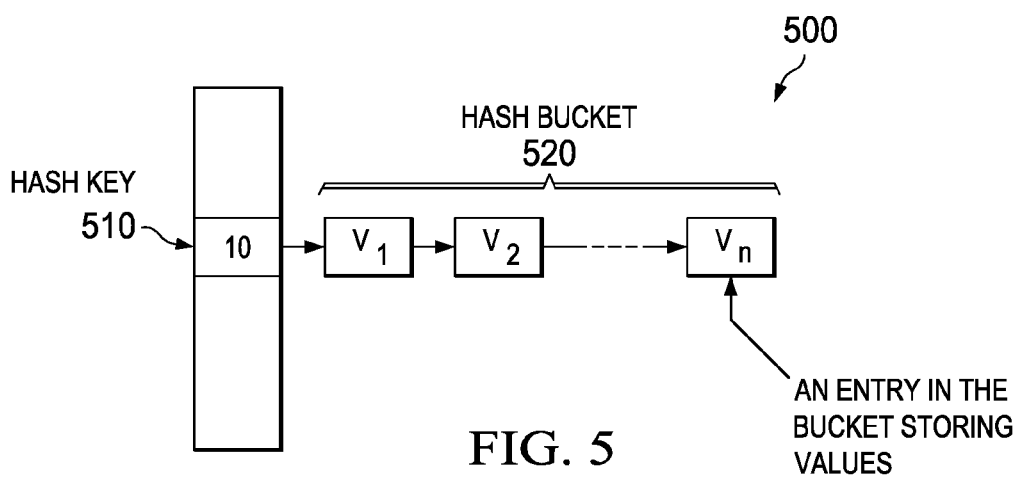

FIG. 5

FIG. 2A
```
create table Product (
        pid varchar (10) not null primary key, Description xml
);
insert into Product values(
'100-100-01', xmlparse(document
        '<product pid="100-100-01">
                <description>
                        <name>Snow Shovel, Basic 22"</name>
                        <details>
                                Basic Snow Shovel, 22" wide,
                                straight handle with D-Grip
                        </details>
                        <price>9.99</price>
                        <weight>1 kg</weight>
                </description>
                <category>Tools</category>
        </product>'
preserve whitespace)
);
create index I_PRICE
        on Product (Description)
        generate key using xmlpattern
        '//price' as sql double;
create index I_CATEGORY
        on Product (Description)
        generate key using xmlpattern
        '/product/category' as sql varchar (10);
```

FIG. 2B
```
for $i in
db2-fn:xmlcolumn ('PRODUCT.DESCRIPTION')
        //product[.//price < 100]
where $i/category = 'Tools'
return $i;
```

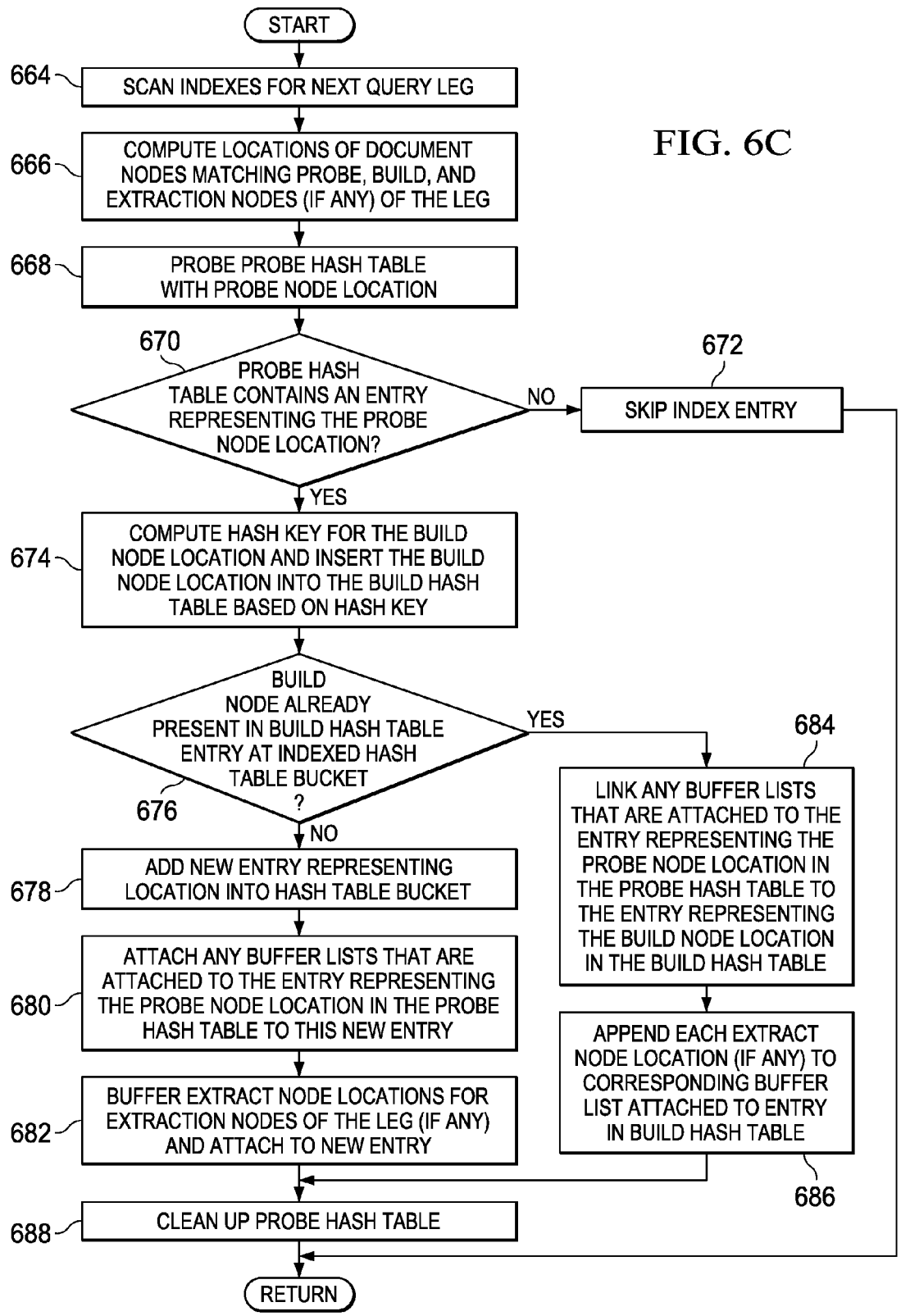

FIG. 7A
```
for $b in doc()/a/b
for $c in $b/c
for $d in $c/d[. = 10]
for $e in $c/e[. > 5]
for $f in $b/f[. < 16]
return <res>{$d, $e, $f}</res>
```
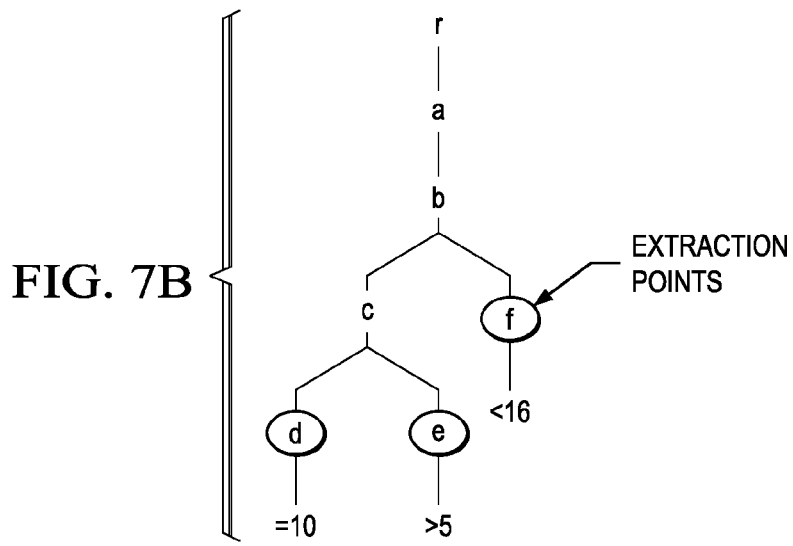
FIG. 7B
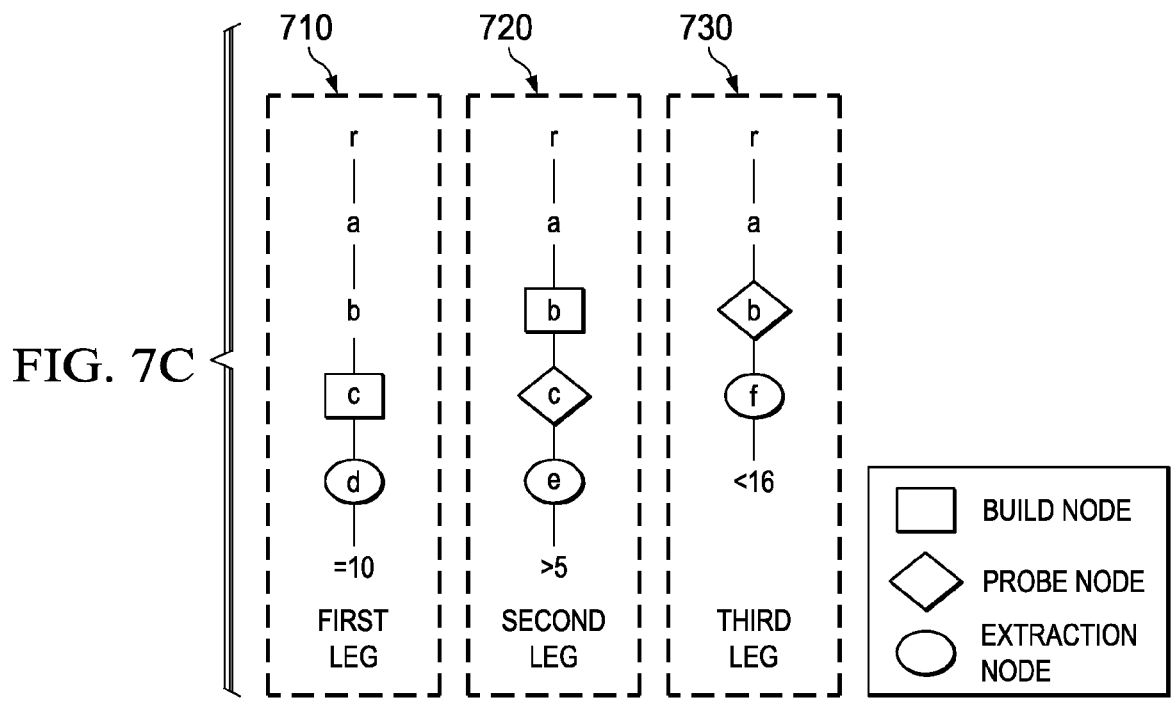
FIG. 7C

FIG. 10

| PATH | PATH ID |
|---|---|
| /a/b/c/d | 1 |
| /a/b/c/e | 2 |
| /a/b/f | 3 |
| ⋮ | ⋮ |

FIG. 11A

| PATH ID (1110) | VALUE (1120) | DOC ID (1130) | NODE ID (1140) | ⋯ |
|---|---|---|---|---|
| 1 | 10 | 1 | 1.1.1.1 | ⋯ |
| 1 | 10 | 2 | 1.1.1.1 | ⋯ |
| 1 | 10 | 3 | 1.1.1.1 | ⋯ |
| 1 | 10 | 3 | 1.1.1.2 | ⋯ |
| 1 | 10 | 4 | 1.1.1.1 | ⋯ |
| 1 | 10 | 5 | 1.1.1.1 | ⋯ |
| 1 | 10 | 6 | 1.1.1.1 | ⋯ |
| 1 | 10 | 6 | 1.1.2.1 | ⋯ |

FIG. 11B

| PATH ID (1110) | VALUE (1120) | DOC ID (1130) | NODE ID (1140) | ⋯ |
|---|---|---|---|---|
| 2 | 6 | 2 | 1.2.1.1 | ⋯ |
| 2 | 6 | 5 | 1.1.1.2 | ⋯ |
| 2 | 8 | 1 | 1.1.2.1 | ⋯ |
| 2 | 9 | 3 | 1.1.1.3 | ⋯ |
| 2 | 12 | 6 | 1.1.1.2 | ⋯ |
| 2 | 15 | 4 | 1.1.1.2 | ⋯ |
| 2 | 16 | 4 | 1.1.1.3 | ⋯ |
| 2 | 18 | 6 | 1.1.2.2 | ⋯ |

| | 1110 | 1120 | 1130 | 1140 | |
|---|---|---|---|---|---|
| | PATH ID | VALUE | DOC ID | NODE ID | ... |
| | 3 | 4 | 5 | 1.1.2 | ... |
| | 3 | 5 | 5 | 1.1.3 | ... |
| | 3 | 6 | 4 | 1.1.2 | ... |
| | 3 | 6 | 6 | 1.1.3 | ... |
| | 3 | 7 | 1 | 1.1.3 | ... |
| | 3 | 7 | 3 | 1.1.2 | ... |
| | 3 | 8 | 2 | 1.1.2 | ... |
| | 3 | 9 | 2 | 1.2.2 | ... |

FIG. 11C

| | PATH ID | VALUE | DOC ID | NODE ID | ... |
|---|---|---|---|---|---|
| INDEX SCAN CURSOR → | 1 | 10 | 1 | 1.1.1.1 | ... |
| | 1 | 10 | 2 | 1.1.1.1 | ... |
| | 1 | 10 | 3 | 1.1.1.1 | ... |
| | 1 | 10 | 3 | 1.1.1.2 | ... |
| | 1 | 10 | 4 | 1.1.1.1 | ... |
| | 1 | 10 | 5 | 1.1.1.1 | ... |
| | 1 | 10 | 6 | 1.1.1.1 | ... |
| | 1 | 10 | 6 | 1.1.2.1 | ... |

1210

DOC ID — 1220
NODE ID FOR c1
10 → 1, 1.1.1 ←
↓
1230
1.1.1.1 ←
NODE ID FOR d1

FIG. 12

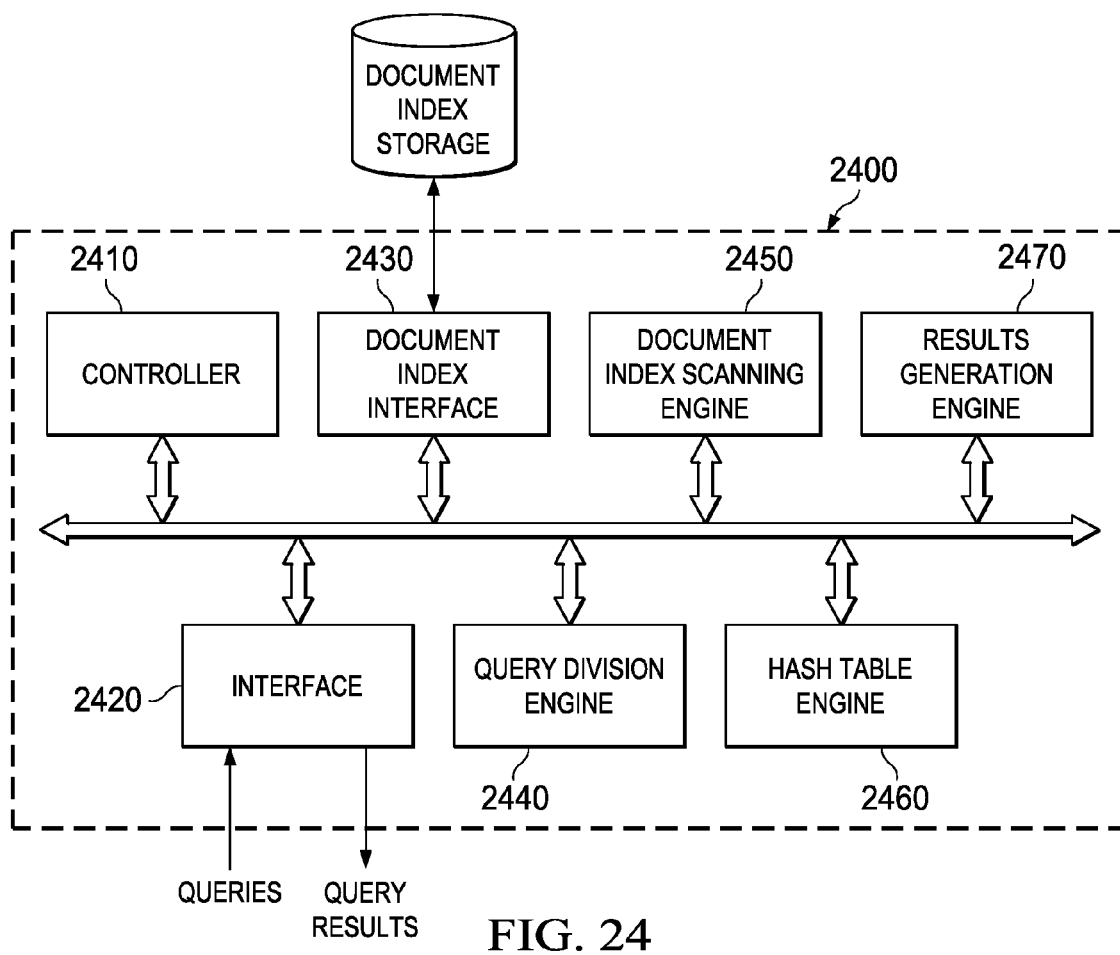

NODE LEVEL HASH JOIN FOR EVALUATING A QUERY

BACKGROUND OF THE INVENTION

1. Field of the Invention

The present application relates generally to an improved data processing apparatus and method and more specifically to an apparatus and method for performing a markup language node level hash join operation for evaluating a query language query.

2. Background of the Invention

Markup languages, such as the Extensible Markup Language (XML), are languages for generating electronic applications, documents, or the like, by combining text and extra information about the information. This extra information includes structure, layout, or other information, and is expressed using markups, such as tags or the like, which are typically intermingled with the primary text. XML has as a primary purpose to facilitate the sharing of structured data across different information systems, particularly via the Internet. XML is often used to generate electronic documents, such as Internet web pages or the like, these electronic documents typically having a structured format.

As the amount of information that is presented in electronic documents increases, electronic document repositories, collections, databases, etc. have been devised for storing these electronic documents. Query languages, such as XQuery and Structured Query Language (SQL) have been developed for querying such repositories to retrieve electronic documents meeting desired criteria. Mechanisms have been devised for evaluating queries provided in such query languages.

BRIEF SUMMARY OF THE INVENTION

In one illustrative embodiment, a method, in a data processing system, is provided for evaluating an electronic document query. The method may comprise receiving a query and separating the query into a plurality of query legs. The method may further comprise performing an index scan for evaluating the query against at least one index of at least one electronic document by processing a query leg on the at least one index of the at least one electronic document to determine if a condition of the query leg is met by the at least one node in the at least one index of the at least one electronic document. If at least one node in the at least one index of the at least one electronic document satisfies the condition of the query leg, an entry in at least one hash table may be populated with information regarding the at least one node. The method may further comprise generating results of the query based on content of the at least one hash table and returning the results of the query to an originator of the query.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example of an XML document in accordance with a known mechanism;

FIG. 2A illustrates an example for creating a table with an XML column, the insertion of an XML document into that column of the table, and the creation of two XML index on that column;

FIG. 2B shows an example XQuery that returns all products having a price less than 100 and a category of "Tools" in the example of FIG. 2A;

FIG. 5 is an exemplary diagram illustrating an example hash table in which data values v1, v2, and vn are mapped to the same hash;

FIG. 6A-6C illustrates a flowchart outlining an exemplary operation of a XHashJoin operator in accordance with one illustrative embodiment; and FIG. 7A illustrates an example XQuery FLWOR expression for explaining the operation of the XHashJoin operator in FIG. 6;

FIG. 7B illustrates an exemplary tree representation of the XQuery FLWOR expression in FIG. 7A;

FIG. 7C illustrates the division of the query in FIG. 7A, as represented by the tree structure in FIG. 7B, into separate legs of the query as well as which nodes of the legs are BUILD, PROBE, and extraction nodes;

FIG. 10 is an exemplary diagram illustrating a data structure of the path indexes on the example XML documents;

FIG. 11A is an exemplary diagram illustrating a data structure of the value indexes on a "//d" XML pattern in accordance with one illustrative embodiment;

FIGS. 11B and 11C illustrate similar value indexes as that of FIG. 11A but defined on the XML patterns //e and //f, respectively, for the documents shown in FIG. 9;

FIG. 12 is an exemplary diagram of a BUILD hash table data structure after scanning the first index entry in the example of FIGS. 11A-11C;

FIG. 23 shows a sample query containing LET extraction nodes, i.e., $d and $e in accordance with one illustrative embodiment; and FIG. 24 is an illustrative functional block diagram of a query evaluation engine in accordance with one illustrative embodiment.

DETAILED DESCRIPTION OF THE INVENTION

Figure 3:
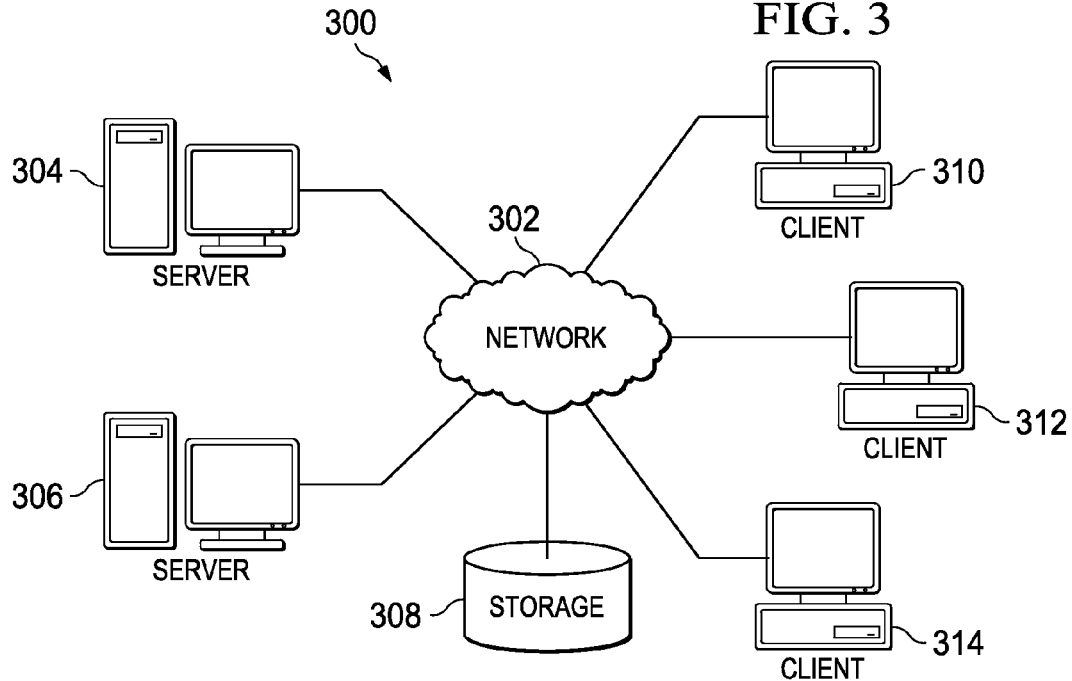
FIG. 3 is an exemplary representation of an exemplary distributed data processing system in which aspects of the illustrative embodiments may be implemented.

FIG. 1 is an example of an XML document provided in a "bookstore.xml" file. As shown in FIG. 1, the XML document comprises a plurality of "book" elements, each having their own characteristic elements including category, title, author, year, and price. The characteristic elements are typically denoted by tags such as "<author>" and "</author>". Each of the elements in the XML document may be represented as nodes in a tree structure that defines the XML document. This tree structure is an instance of the XML Data Object Model. Thus, a structured format for defining an electronic document is provided using XML. These structured formats of electronic documents may be searched using query languages to identify documents of interest.

XQuery is a query language (with some programming language features) that is designed to query collections of XML data. It is semantically similar to Structured Query Language (SQL), however XQuery combines many of the declarative features of SQL with the document navigational features of XPath while subsuming neither. XQuery provides the means to extract and manipulate data from XML documents or any data source that can be viewed as XML, such as relational databases or office documents. XQuery uses XPath expression syntax to address specific parts of an XML document. XQuery supplements the XPath Expression syntax with a SQL-like "FLWOR expression" for performing joins.

A FLWOR expression is constructed from the five clauses after which it is named: FOR, LET, WHERE, ORDER BY, and RETURN. A FLWOR expression specifies zero or more FOR and LET clauses that describe the data to be accessed, an optional WHERE clause that defines conditions on that data, an optional ORDER BY clause for ordering the result, and a RETURN clause that specifies the structure of the data returned by that query. The FOR and LET clauses can optionally assign intermediate results to variable names denoted by a preceding "$".

For example, an XQuery XPath expression for searching the XML document of FIG. 1 might be the following:
doc("bookstore.xml")/bookstore/book/title The "/bookstore" portion of the XPath selects the bookstore element. The "/book" selects all the book elements under the bookstore element. The "/title" selects all the title elements under each book element. Thus, a result of the above XQuery will be:

```
<title lang="en">Sly Chef</title>
<title lang="en">Harry Potter and the Chamber of Secrets</title>
<title lang="en">XQuery Basics</title>
<title lang="en">Learn to XML</title>
```

To further limit the data extracted from the XML document of FIG. 1, XQuery allows predicates, or conditions, to be used to further define the results that are desired to be returned from the XQuery query. For example, the following predicate may be used to select all the book elements under the bookstore element that have a price element with a value that is less than 20:
doc("bookstore.xml")/bookstore/book[price<20]

The XQuery above will result in the following data being extracted from the XML document bookstore.xml:

```
<book category="COOKING">
  <title lang="en">Sly Chef</title>
  <author>Barry Jenson</author>
  <year>2005</year>
  <price>15.00</price>
</book>
```

The FLWOR expression is another way of expressing a XQuery in which the results that are returned by the XQuery may be sorted and ordered. For example, the XQuery XPath expression "doc("bookstore.xml")/bookstore/book[price>30]/title" will select all the title elements under the book elements that are under the bookstore element that have a price element with a value that is higher than 30. The following FLWOR expression will perform the same exact search as the XPath expression:

```
for $x in doc("bookstore.xml")/bookstore/book
where $x/price>30
return $x/title
```

Moreover, with the FLWOR expression, a sorting of the results may be obtained by providing an "order by" clause:

```
for $x in doc("bookstore.xml")/bookstore/book
where $x/price>30
order by $x/title
return $x/title
```

In the above FLWOR expression, the FOR clause selects all book elements under the bookstore element into a variable called $x, the WHERE clause selects only book elements with a price element with a value greater than 30, the ORDER BY clause defines the sort-order, e.g., sort by title element, and the RETURN clause specifies what should be returned, e.g., the title element. More information regarding XML documents and XQuery may be found at http://www.w3schools.com/xquery/default.asp.

With the increased acceptance of XML by the information technology industry as a ubiquitous language for data interchange, there has been a concomitant increase in the need for repositories, or databases, that natively store, update, and query XML documents. For example, there has been an increase in the number of DB2 databases having XML document stores which may be queried using a query language. As a result, XQuery has emerged as the primary language for querying XML documents.

Because of the large amount of data present in XML documents, the large number of XML documents in repositories, collections, or databases, and the like, it is often desirable to provide indexes, i.e. XML indexes, of these XML documents and the data within these XML documents for more efficient evaluation of XQuery queries. An XML index is a data structure that provides quick access to document nodes matching an XPath pattern, such as //product/category. For example, an XML index may be a data structure containing document nodes matching //items//price, but without any value constraint on the price. These XML indexes are used as filters for filtering out documents that definitely do not satisfy the predicates of the XQuery with the remaining documents being fully evaluated by the XQuery through a traversing of the document data.

To illustrate the manner by which XML indexes may be generated for XML documents, consider the example shown in FIG. 2A. FIG. 2A illustrates an example for creating a table with an XML column, the insertion of an XML document into that column of the table, and the creation of two XML index on that column. In this example, //price and/product/category are XPath patterns. The last two statements in the example of FIG. 2A define indexes I_PRICE and I_CATEGORY that contain references to only those nodes in "Description" documents whose root-to-node paths match these XPath patterns, organized by the values of such nodes. The "//" notation in the first XPath pattern permits any number of nodes between the root node of each document and an instance of a price node.

As shown in FIG. 2A, each XQuery query contains a FLWOR expression. Within the FLWOR expression, the FOR clause can be thought of as an iterator that accesses items from XML data, creating one row per item in the table. The LET clause effectively arranges those data items into a sequence in one row of the table. For example, FIG. 2B shows an example XQuery that returns all products having a price less than 100 and a category of "Tools." The FOR clause iterates over the product nodes in all documents of PRO-DUCT.DESCRIPTION that match the given XPath pattern, assigning each to the variable $i. Those whose category is "Tools" survive the filtration of the WHERE clause and are RETURNed to the user.

Although the semantics of the XQuery language require that results be returned in the order specified by any nested FOR clauses, the requirement does not mandate the strategy for evaluating those clauses by an optimizer and many aspects of XQuery, such as nested FOR loops and XPath navigation, partially restrict the order in which XQuery queries should be processed. XQuery has enough alternative execution choices to need cost-based optimization in the same way that SQL queries do. The example in FIGS. 2A-2B illustrates that even simple XQuery queries require many of the same optimization decisions required for SQL queries. Because an XML user may define multiple XML indexes for an XML database on an XML column of an XML database table, as well as a traditional index on any combination of relational columns, the optimizer must decide which of these alternative access paths, either individually or in combination, to exploit in evaluating an XQuery query.

Moreover, XQuery adds additional complexity in that it permits "join" predicates, i.e. WHERE clauses or XPath predicates that relate the values of multiple columns, nodes from documents in multiple XML columns, or nodes from multiple paths in the same document from the same XML column, of an XML database table. Currently, there are two main technologies for evaluating XQuery queries having complex predicates, such as joined predicates, using XML indexes: Index Anding (IXA) and XML ANDing and ORing (XANDOR). IXA is an operator that implements node-level index ANDing of the results from multiple index scans using Bloom filters, which is an approximate encoding of a set. IXA encodes results from one index scan as a set of bits and ANDs bit sets from multiple index scans to produce documents that qualify a query's predicates. Due to the approximate encoding nature of Bloom filters, IXA may produce false positives. That is, IXA may also returns documents that do not satisfy all the predicates in a query.

XANDOR is an operator that generates an index over XML data by ANDing the results of multiple index scans. XANDOR is used for the evaluation of equality predicates from a single XQuery query. The operator allows ANDed predicates to be applied to multiple indexes to reduce underlying table accesses to a minimum.

Both the IXA and XANDOR operations use XML indexes only as document filters, i.e. XML indexes are first used to filter out documents that definitely do not satisfy the predicates in the XQuery query with the remaining XML documents being fed to an XML streamlined query evaluation engine, referred to as "navigation," to be fully evaluated by traversing the documents relative to the XQuery query. Such approaches are inefficient because of the predicate re-evaluations during navigation, which may need to traverse the whole document, possibly spanning several disk pages. In addition, XANDOR supports only queries with equality predicates and not range predicates causing XANDOR to be limited in its application. IXA supports both equality and range predicates. However, IXA may contain false positives as noted above, i.e. unqualified documents (documents that do not satisfy all the predicates in a query. For example, for the query in FIG. 2B, a product with either a price>=100 or category !="Tool" is considered as unqualified). Thus, unqualified documents may still be fed into navigation for predicate re-evaluation after applying the IXA operation over XML indexes.

The illustrative embodiments provide an apparatus and method for performing a markup language node level hash join for evaluating a query language query. The mechanisms of the illustrative embodiments utilize indexes, such as XML indexes, without the need for predicate re-evaluation. Moreover, the mechanisms of the illustrative embodiments support queries with both equality and range predicates.

The hash join operation of the illustrative embodiments is a hierarchical hash join operation, as opposed to a relational hash join operation. A relational hash join is a two-way join operation that uses only one hash table. The relational hash join operation joins two relational tables through two phases: a build phase, and a probe phase. The relational hash join operation, during the build phase, first prepares a hash table for the smaller relation by applying a hash function to the join attribute of each row. The relational hash join operation then, during a probe phase, scans the larger relational and finds the relevant rows by probing the hash table. Both phases scan over either relational indexes or relational tables. When multiple rows in the smaller relation hash to the same hash key, they are stored into the same hash bucket though a one-dimensional data structure, such as a link list.

The hierarchical hash join operation of the illustrative embodiments is a multi-way join operation that uses two hash tables. As shown hereafter, except for the processing of the first query leg, the processing of every other leg involves a probing phase and then a building phase. During the building phase, the hierarchical hash join operation scans over hierarchical document indexes only. In addition, during the building phases, the hierarchical hash join operation not only stores document nodes matching a BUILD node (described in greater detail hereafter) using a one-dimensional link list, but, more importantly, the hierarchical hash join operation buffers up all the document nodes matching the query extractions so far using a compact and multi-dimensional data structure that preserves the hierarchical structure relationships among them.

The hierarchical markup language node level hash join mechanism of the illustrative embodiments is referred to herein as the "XHashJoin" operator or operation. XHashJoin is a multi-way join operator that uses two hash tables, referred to as the BUILD hash table and the PROBE hash table, to intersect document nodes from multiple index scans and to buffer intermediate query results. The BUILD hash table is used to store document nodes matching the predicates of a query as the indexes of the documents are being scanned for each portion of the query up to a current portion of the query being evaluated. The BUILD hash table further buffers document nodes satisfying extraction nodes of each portion of the query up to a current portion of the query being evaluated. The BUILD hash table and the PROBE hash table are switched at each portion of the query being evaluated. Query results are generated by linking document nodes buffered in the BUILD hash table based on the semantics of each extraction node.

For example, given an XQuery FLWOR expression, XHashJoin first divides the expression into multiple legs, where each leg is a linear XPath with an optional value predicate on the last step of the XPath. These legs may be ordered by their selectivities and each of them may be associated with a BTree value index. XHashJoin also assigns a BUILD node and a PROBE node for each leg. A leg's BUILD node is the lowest common ancestor node that connects the leg with its right neighboring leg and a leg's PROBE node is the lowest common ancestor node that connects the leg with its left neighboring leg.

XHashJoin performs an index scan over each leg, where each index scan searches the leg's corresponding BTree value indexes for entries matching the leg's predicate. For each qualified index entry, XHashJoin uses the document node matching the leg's PROBE node to look up the PROBE hash table. The PROBE hash table stores all the document nodes satisfying the predicates from all the legs prior to the current leg. If the look-up is successful, XHashJoin adds the document node matching the leg's BUILD node into the BUILD hash table. In addition, if the current leg contains any extraction node, i.e. a node used in the query's RETURN clause, the XHashJoin operator also buffers the document node matching the leg's extraction node in the BUILD hash table as well as document nodes matching extraction nodes in previous legs, which are available in the PROBE hash table.

After all the qualifying index entries for the current leg have been scanned and processed, the BUILD hash table contains document nodes matching predicates from all the legs up to the current leg and buffers document nodes satisfying extraction nodes from all the legs up to the current leg. Before starting processing of the next leg, XHashJoin swaps the BUILD hash table and the PROBE hash table and repeats the leg processing procedure outlined above. This swapping operation may be performed with each subsequent leg that is processed until all the legs are processed. Finally, the XHashJoin operator constructs query results by linking document nodes buffered in the BUILD hash table based on the FOR/LET semantics associated with each extraction node.

Compared to existing index based query evaluation techniques, the XHashJoin operator fully utilizes indexes for evaluating queries and avoids navigations for predicate re-evaluation. Moreover, the XHashJoin operator supports queries with both equality and range value predicates. Furthermore, XHashJoin supports queries with multiple extraction points and FOR/LET semantics in XQuery. XHashJoin also is false-positive free and is a multi-way node level join operator.

As noted above, both IXA and XANDOR scan indexes only to filter documents that definitely do not qualify query predicates. Thus, both tools need to traverse XML documents and re-evaluate predicates to return document nodes as query results. However, with the XHashJoin operator of the illustrative embodiments, node-level joining with support of both equality and range predicates is performed with the XHashJoin operator returning document nodes (but not documents) satisfying query predicates without false positives. Thus, the XHashJoin operator can avoid predicate re-evaluation.

The XHashJoin operator uses Hash joins (instead of Bloom Filters) for joining results from multiple index scans. XHashJoin resolves collisions (i.e., different results mapping into the same hash value) by buffering up all the document nodes having a specific hash value. During probing, XHashJoin checks not only whether the hash bucket corresponding to a hash value is empty or not, but also compares the probed node with document nodes buffered in the bucket. Such comparisons make XHashJoin false positive free.

Moreover, relational HashJoin operators are two-way join operators using a single Hash table in that it joins only the same attribute from two relational tables. XHashJoin uses two hash tables (a BUILD and a PROBE hash table) for joining results from multiple index scans, which makes it a multi-way node level join operator.

Figure 4:
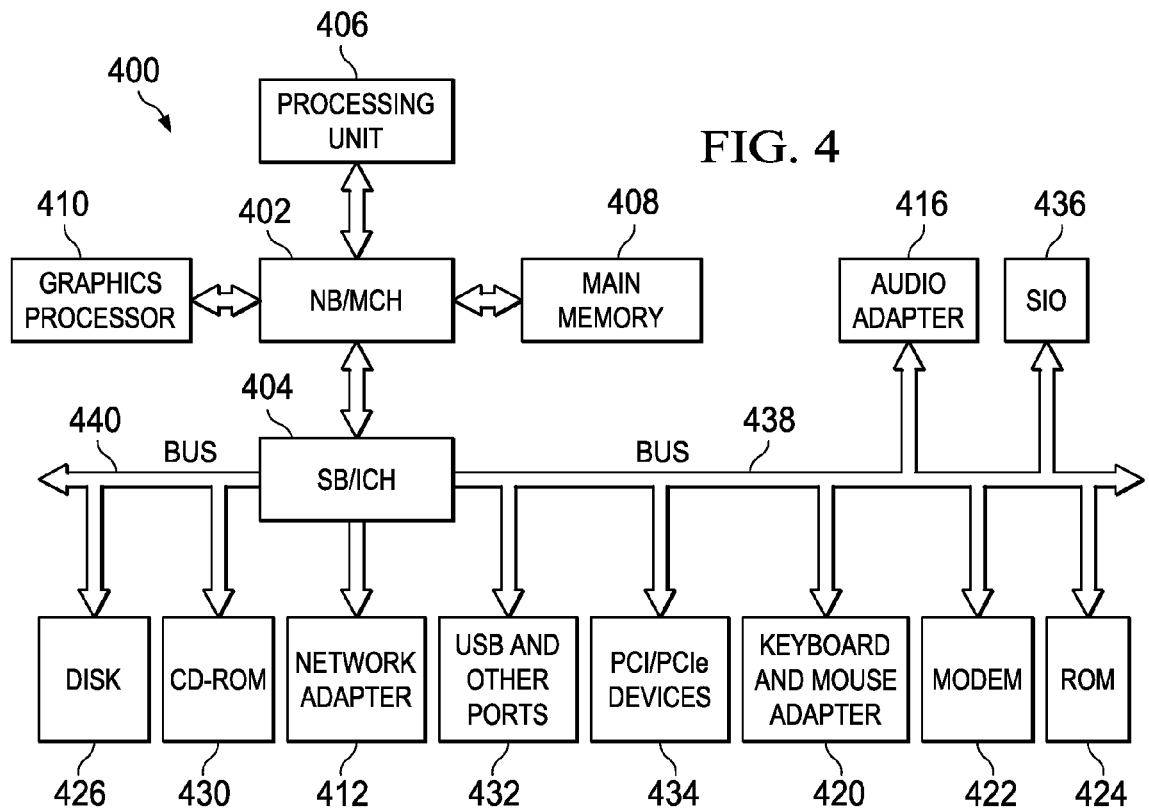
FIG. 4 is a block diagram of an exemplary data processing system in which aspects of the illustrative embodiments may be implemented.

In modern computing systems, query language queries, such as XQuery and the like, are made against databases and repositories which may span multiple computing systems and may be accessed remotely via one or more data networks. Thus, the mechanisms of the illustrative embodiments may be implemented in a stand-alone computing device or in a distributed data processing system, for evaluating queries on electronic document data. In order to provide a context for the following description of the illustrative embodiments, FIGS. 3-4 are provided as examples of the possible data processing environments in which the illustrative embodiments may be implemented. It should be noted that the mechanisms of the illustrative embodiments are not limited to being implemented in a single computing device, although this is one possible implementation, and may be implemented in a distributed manner as well without departing from the spirit and scope of the present invention.

With reference now to the figures and in particular with reference to FIGS. 3-4, exemplary diagrams of data processing environments are provided in which illustrative embodiments of the present invention may be implemented. It should be appreciated that FIGS. 3-4 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 3 depicts a pictorial representation of an exemplary distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 308. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

With reference now to FIG. 4, a block diagram of an exemplary data processing system is shown in which aspects of the illustrative embodiments may be implemented. Data processing system 400 is an example of a computer, such as hosts 310 in FIG. 3, in which computer usable code or instructions implementing the processes for illustrative embodiments of the present invention may be located.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash binary input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 400 (Java is a trademark of Sun Microsystems, Inc. in the United States, other countries, or both).

As a server, data processing system 400 may be, for example, an IBM® eServer™ System p® computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

Those of ordinary skill in the art will appreciate that the hardware in FIGS. 3-4 may vary depending on the implementation. Other internal hardware or peripheral devices, such as flash memory, equivalent non-volatile memory, or optical disk drives and the like, may be used in addition to or in place of the hardware depicted in FIGS. 3-4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device which is configured with flash memory to provide non-volatile memory for storing operating system files and/or user-generated data, for example. Essentially, data processing system 400 may be any known or later developed data processing system without architectural limitation.

The illustrative embodiments provide an apparatus and method for performing a markup language node level hash join for evaluating a query language query. The mechanisms of the illustrative embodiments may be implemented in a query evaluation engine of a data processing system, such as may be provided in data processing system 400 in FIG. 4. This data processing system may be part of a markup language based database, such as an DB2 Extensible Markup Language (XML) database, or the like, and may be used to evaluate queries, such as Structured Query Language (SQL) or XQuery queries, submitted to the markup language based database from a source of the query, e.g., a human user, a computer application or routine, or other manual or automated mechanism. The mechanisms of the illustrative embodiments operate upon markup language indexes, such as XML indexes, generated and stored by the markup language based database with results of the queries being provided back to the originator of the query.

For purpose of the description of the illustrative embodiments, it will be assumed that the query evaluation engine of the illustrative embodiments is associated with one or more data processing systems providing a markup language based database that receives queries from client computing devices as markup language queries. In particular, the description hereafter will make reference to XML databases, XML documents, XQuery, XML indexes, and FLWOR expressions. However, it should be appreciated that these are only exemplary embodiments and the mechanisms of the illustrative embodiments may be applied to other markup languages, query languages, and indexes without departing from the spirit and scope of the present invention. XML and XQuery are utilized herein because they are the most prevalent in use today with regard to generating electronic documents and querying repositories of such electronic documents.

The illustrative embodiments provide a new operator and associated hash table data structures within the query evaluation engine for use in evaluating complex predicates of query language queries, e.g., XQuery queries. This new operator is referred to herein as the "XHashJoin" operator, operation, or simply as "XHashJoin." In order to best understand the operation of XHashJoin, it is first important to understand the hash table data structures utilized by the XHashJoin operator.

A hash table data structure is an associated array data structure that associates keys with values. Keys are generated by applying a hash function to a portion of data to generate a key value. Data values associated with the same key value, i.e. the hash function resulting in a same hash value being generated, may be chained together in the same hash "bucket". For example, FIG. 5 shows an example hash table 500 in which data values v1, v2, and vn are mapped to the same hash key 510 having the hash key value of 10. Thus, these data values are stored in the same hash bucket 520 indexed by the hash key 510, i.e. hash key 10. Data values may be retrieved from the hash table data structure by applying the hash function to a data value to generate an index value, i.e. a hash key value, which is then used to retrieve the associated data value(s) from an entry in the hash table data structure corresponding to that hash key value.

The XHashJoin operator uses such hash table data structures to store document nodes matching predicates of queries as well as buffer intermediate results of the queries. First, a flowchart of the overall operation of the XHashJoin operator in accordance with one illustrative embodiment will be described with reference to the BUILD and PROBE hash table data structures utilized by the XHashJoin operator. Thereafter, a specific example showing the manner by which these hash table data structures are utilized by the XHashJoin operator will be described. It should be appreciated that the functions and operations outlined in the following description may be performed by a query evaluation engine of a data processing system as discussed above, when evaluating a submitted query, such as from a client computing device.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6A:
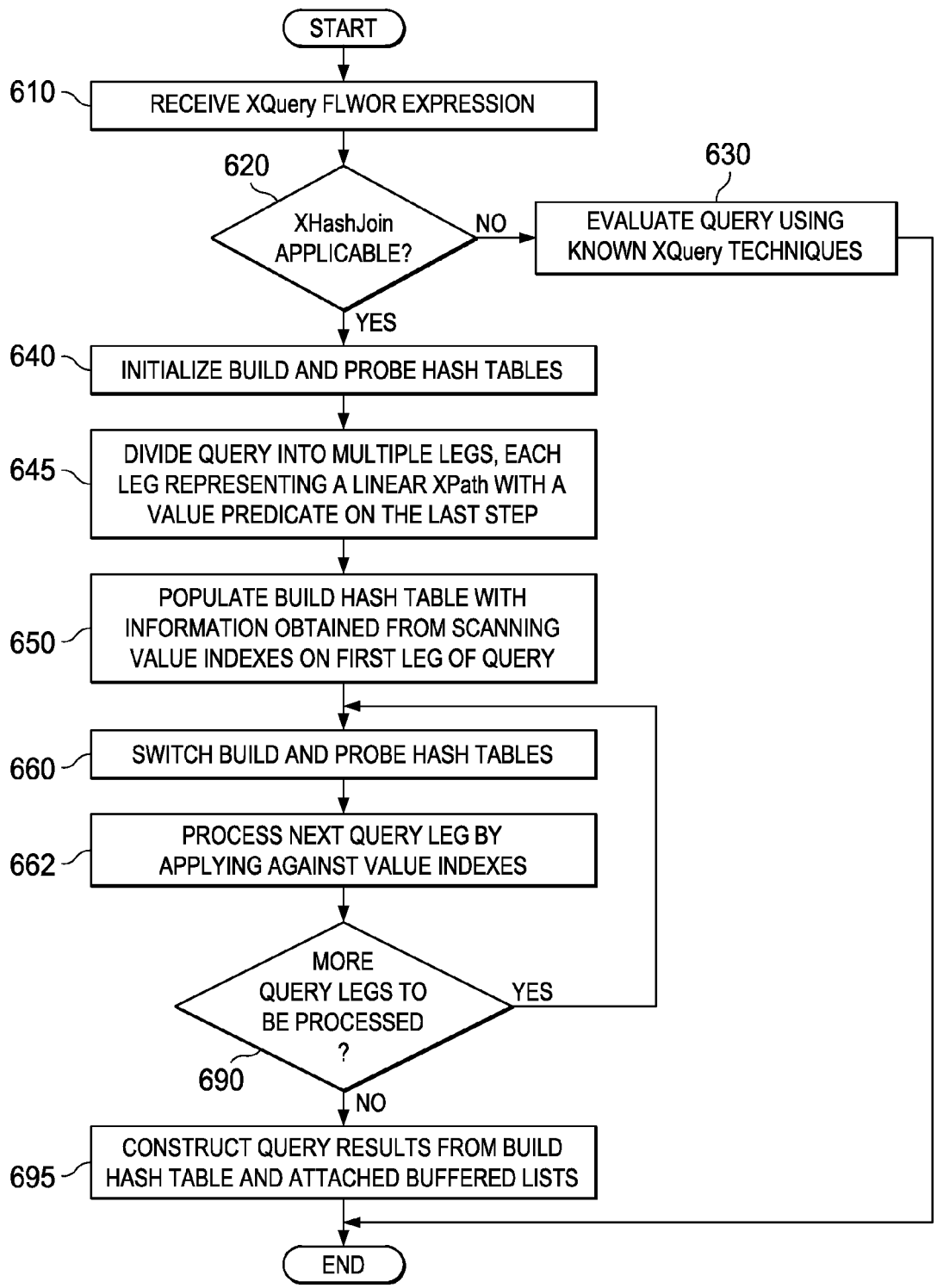
Figure 6B:
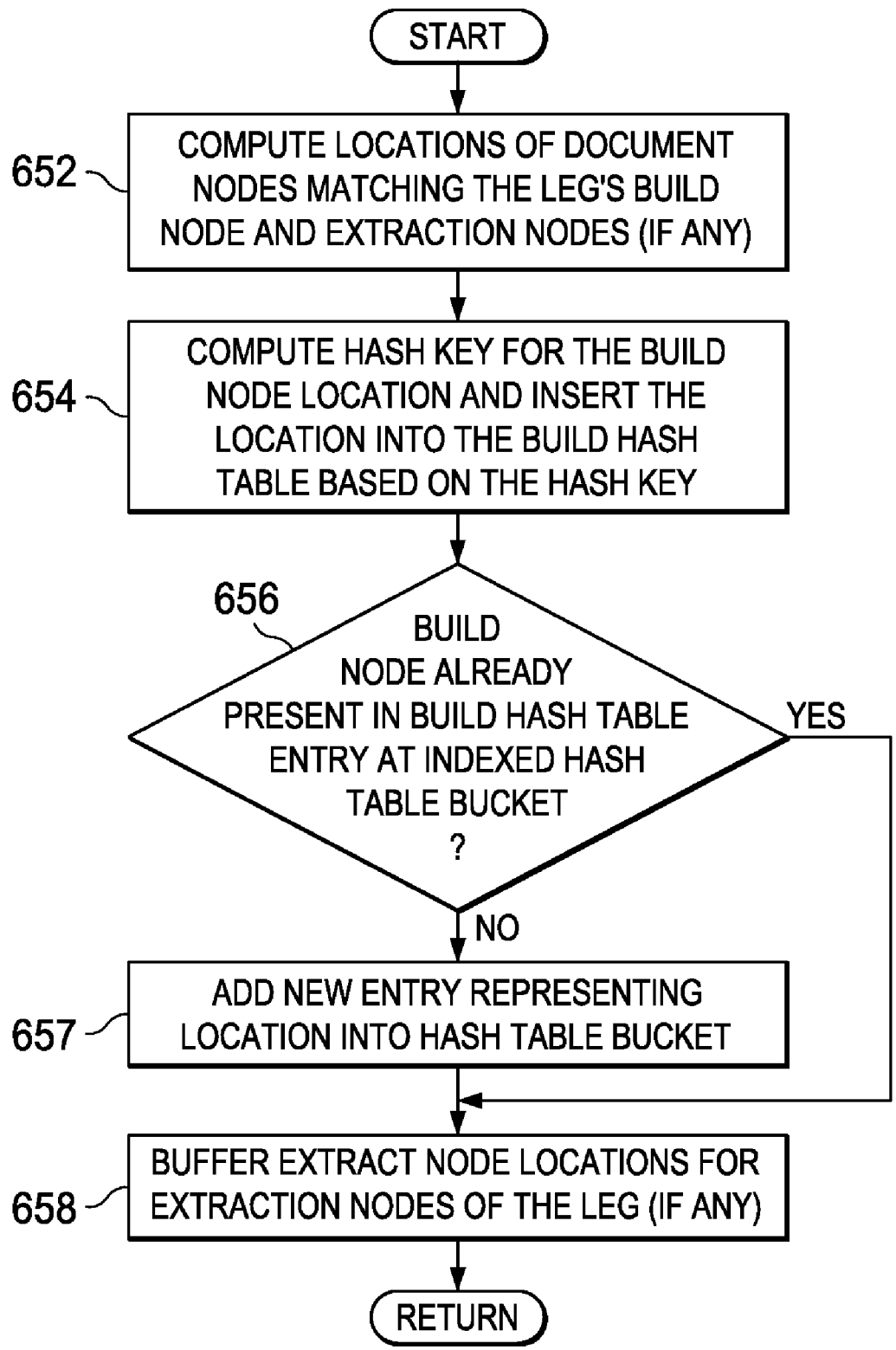

Referring now to FIGS. 6A-6C, these figures provide flowcharts outlining exemplary operations of a XHashJoin operator in accordance with one illustrative embodiment. As shown in FIG. 6A, the XHashJoin operator first receives an XQuery FLWOR expression (referred to hereafter as the "query") (step 610). This XQuery FLWOR expression may be received from an originator of a query, such as a user inputting the query, a computer application or routine submitting the query, or any other user initiated or automated originator of a query. XHashJoin checks whether the XHashJoin operator is applicable to the query (step 620). This may be performed, for example, by looking at the number of leaf nodes in a tree representation of the query. If the tree representation of the query contains only one leg, i.e. only one leaf node, then the query is not suitable for XHashJoin since XHashJoin is a multi-way join operator. If XHashJoin is not applicable to the query, then the query is evaluated using existing XQuery evaluation techniques (step 630) and the operation terminates.

For example, FIG. 7A illustrates an example XQuery FLWOR expression with its corresponding tree representation being illustrated in FIG. 7B. As can be seen from FIG. 7B, the tree representation of the query in FIG. 7A contains multiple leaf nodes, i.e. nodes d, e, and f, with nodes in the tree structure representing elements in the XQuery FLWOR expression. Since the tree representation has more than one leaf node, and thus, more than one leg, the query of FIG. 7A may be evaluated using the XHashJoin operator of the illustrative embodiments.

With reference again to FIG. 6A, if the XHashJoin operator is applicable to evaluating the query, XHashJoin initializes two empty hash tables, one BUILD hash table and one PROBE hash table (step 640). XHashJoin also divides the query into multiple legs where each leg represents a linear XPath with an optional value predicate on the last step (step 645). The division of the XQuery into multiple legs may be performed, for example, by traversing the tree structure representation of the XQuery (FIG. 7B) from a root node to each leaf node, with the path between the root node and the leaf node representing a leg of the query. Each leg may contain zero or more extraction nodes, where an extraction node is a query node used in the XQuery's RETURN clause. These legs may be ordered by the selectivities of the leg's structure constraint and value predicate. For example, for the three legs in FIG. 7C, each leg has 8 matching entries from their corresponding value indexes. Thus, their selectivities are the same. If the value predicates are changed in the query to /r/a/b/c/d=10, /r/a/b/c/d/e>9 and /r/a/b/f<6, then there are 8 entries matching /r/a/b/c/d=10, 4 entries matching /r/a/b/c/e>9, and 2 entries matching /r/a/b/f<6. In this case, XHashJoin can process the most selective leg (/r/a/b/f<6) first, then the /r/a/b/c/e>9 leg, and finally the least selective leg /r/a/b/c/d=10.

Neighboring legs are connected by the lowest common ancestor of their leaf nodes. The node that connects a leg to its left neighboring leg is referred to as the leg's PROBE node and the node that connects a leg to its right neighboring leg is referred to as the leg's BUILD node. The first leg does not have a left neighboring leg and thus, it does not have a PROBE node. Similarly, the last leg does not have a right neighboring leg and thus, it does not have a BUILD node.

FIG. 7C illustrates the division of the query in FIG. 7A, as represented by the tree structure in FIG. 7B, into separate legs of the query as well as which nodes of the legs are BUILD, PROBE, and extraction nodes. As shown in FIG. 7C, the first leg 710 and the second leg 720 are connected by the node c and thus, node c is the BUILD node for the first leg and the PROBE node for the second leg. The second leg 720 and third leg 730 are connected by the node b and thus, node b is the BUILD node for the second leg 720 and the PROBE node for the third leg 730. It can be seen from FIG. 7C that the extraction nodes correspond to the elements d, e, and f specified in the RETURN clause of the XQuery FLWOR expression shown in FIG. 7A. The terminating node in each leg is the predicate for the corresponding element in the extraction node.

Referring again to FIG. 6A, having initialized the BUILD hash table and PROBE hash table, and divided the query into multiple legs, the XHashJoin operator populates the BUILD hash table with information obtained from scanning the value indexes on the first leg, e.g., first leg 710 (step 650). Each qualifying index entry, i.e. an index entry that satisfies a query predicate, contains the location of a document node, such as in the form of (doc ID, node ID), matching the leg's leaf node. With this document node location, referring now to FIG. 6B, XHashJoin first computes the locations of document nodes matching the leg's BUILD node and extraction nodes (if any)(step 652). These are referred to as the BUILD node location and EXTRACT node location, respectively. XHashJoin then computes the hash key for the BUILD node location and inserts the location into the BUILD hash table based on the hash key (step 654).

There are two cases to consider when inserting a document node location into the BUILD hash table based on whether or not the BUILD node location is already present in the BUILD hash table entry at the indexed hash table bucket (step 656). In a first case, the hash table bucket indexed by the hash key in the BUILD hash table is either empty or does not contain any entry representing this BUILD node location. In this case, the BUILD node location is a new location to the BUILD hash table. Thus, XHashJoin adds a new entry representing this location into the hash table bucket (step 657). If the leg contains any extraction node, then XHashJoin buffers the EXTRACT node locations for result construction purposes (step 658). In such scenarios, XHashJoin creates a buffer list for extraction nodes, adds each EXTRACT node location into the corresponding buffer list and attaches these buffer lists to the newly created entry.

In the second case, the hash bucket indexed by the hash key in the BUILD hash table contains an entry whose location is the same as the current BUILD node location. In this case, there is no need for adding a new entry into the BUILD hash table. If the leg contains any extraction node, then XHashJoin appends the EXTRACT node location(s) into the corresponding buffer list(s) pointed to by the BUILD hash table entry (step 658). The operation then returns to step 650 in FIG. 6A.

Having processed the first leg of the query, the XHashJoin operator switches the BUILD and PROBE hash tables (step 660) such that for the next leg of the query, the BUILD hash table is now the PROBE hash table and the PROBE hash table is now the BUILD hash table. The XHashJoin operator then processes the next leg (step 662). The processing of legs subsequent to the first leg of the query is shown in FIG. 6C. As shown in FIG. 6C, XHashJoin scans the value indexes for this next leg (step 664) and computes the locations of the document nodes matching the PROBE, BUILD, and extraction nodes (if any) of the leg (step 666).

XHashJoin probes the PROBE hash table with the PROBE node location (step 668) and determines if the PROBE hash table contains an entry representing the PROBE node location (step 670). If the PROBE hash table does not contain an entry representing the PROBE node location, then the index entry may be skipped (step 672). Otherwise, XHashJoin computes the hash key for the BUILD node location and inserts the BUILD node location into the BUILD hash table based on the hash key (step 674).

Similar to the addition of BUILD node locations to the BUILD hash table for the first leg of the query, there are two cases to consider when inserting a BUILD node location into the BUILD hash table (step 676). In a first case, the hash table bucket indexed by the hash key in the BUILD hash table is either empty or does not contain entries representing this BUILD node location. In this case, this BUILD node location is a new location to the BUILD hash table. Thus, XHashJoin adds a new entry representing this BUILD node location into the hash table bucket (step 678). XHashJoin also attaches any buffer lists that are attached to the entry representing the PROBE node location in the PROBE hash table to this new entry (step 680). Furthermore, if the leg contains any extraction nodes, then XHashJoin creates a new buffer list for each extraction node, adds each EXTRACT node location into the corresponding buffer list, and attaches these buffer lists to the new entry (step 682).

Figure 8:
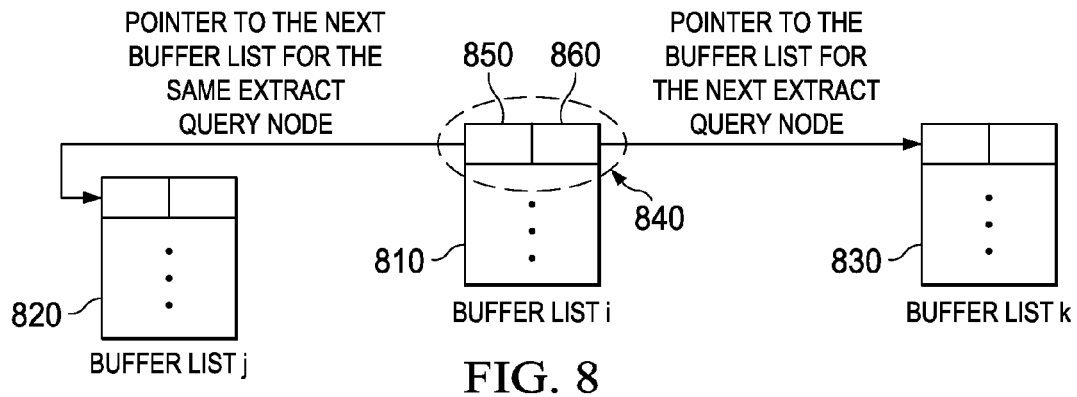
FIG. 8 is an exemplary diagram of a data structure for interconnecting buffer lists for different EXTRACT nodes in accordance with one illustrative embodiment.

In one illustrative embodiment, buffer lists for different EXTRACT nodes are interconnected using a data structure, such as that shown in FIG. 8. As shown in FIG. 8, each buffer list 810-830 stores the locations of document nodes that match the same EXTRACT query node under the same PROBE node location. Each buffer list 810-830 has a header 840 with two pointers 850-860. The left pointer 850 of the header 840 in buffer list 810 points to the next buffer list 820 for the same EXTRACT query node such that the nodes in the two buffer lists 810 and 820 are under different PROBE node locations. The right pointer 860 points to the buffer list 830 for the next EXTRACT query node such that the nodes in the two buffer lists 810 and 830 are under the same document node location matching the query node connecting the two EXTRACT query nodes.

Linking buffer lists in such a way provides two significant advantages. First, the linking of the buffer lists compactly represents partial results for all the extraction nodes processed so far. Suppose that there are m extraction nodes processed so far and that there are N1, N2, . . . Nm nodes matching these extraction nodes respectively. If all the extraction nodes are of FOR semantics, then there are N1*N2* . . . *Nm results in total, which only requires N1+N2+ . . . +Nm buffer spaces. Second, once all the legs have been processed, query results can be efficiently constructed by combining document nodes in buffer lists that are interconnected by their right pointers without the need for checking the structural relationships among the nodes in different buffer lists.

Returning to FIG. 6C, in the second case of step 676, the hash bucket indexed by the hash key in the BUILD hash table contains an entry whose location is the same as this current BUILD node location. In this case, there is no need for adding a new entry into the BUILD hash table. XHashJoin, however, needs to link any buffer lists that are attached to the entry representing the PROBE node location in the PROBE hash table to the entry representing the BUILD node location in the BUILD hash table (step 684). If the leg of the XQuery FLWOR expression contains any extraction nodes, then XHashJoin appends each EXTRACT node location into the corresponding buffer list attached to the entry in the BUILD hash table (step 686). After all the matching index entries for the leg have been processed, the XhashJoin operator then cleans up the PROBE hash table (step 688) and the operation returns to step 662 in FIG. 6A. Such "clean up" operations include destructing the structures in the PROBE hash table that are used to buffer intermediate results, for example.

If there are more legs to be processed (step 690), the XHashJoin operator returns to step 660. This process may be repeated until all the legs of the query have been processed. It should be noted that the last leg may be processed in a similar fashion as any intermediate leg by considering the last leg's PROBE node to be its BUILD node as well.

Once all of the legs of the query have been processed in the above manner, XHashJoin constructs query results (step 695). The query results may be constructed, for example, by traversing each entry in the BUILD hash table and linking EXTRACT node locations stored in the buffer lists attached to the entry based on the FOR/LET semantics. The query results are thus, a list of document nodes that satisfy the query. These query results may be returned to the originator of the query (step 699) and the operation then terminates.

Thus, the illustrative embodiments provide a mechanism for performing a markup language node level hash join operation for evaluating a query language query. The mechanisms of the illustrative embodiments improve upon known techniques by utilizing indexes, such as XML indexes, without the need for predicate re-evaluation. Moreover, the mechanisms of the illustrative embodiments support queries with both equality and range predicates while avoiding such predicate re-evaluation. Known mechanisms cannot achieve such results.

Figure 9:
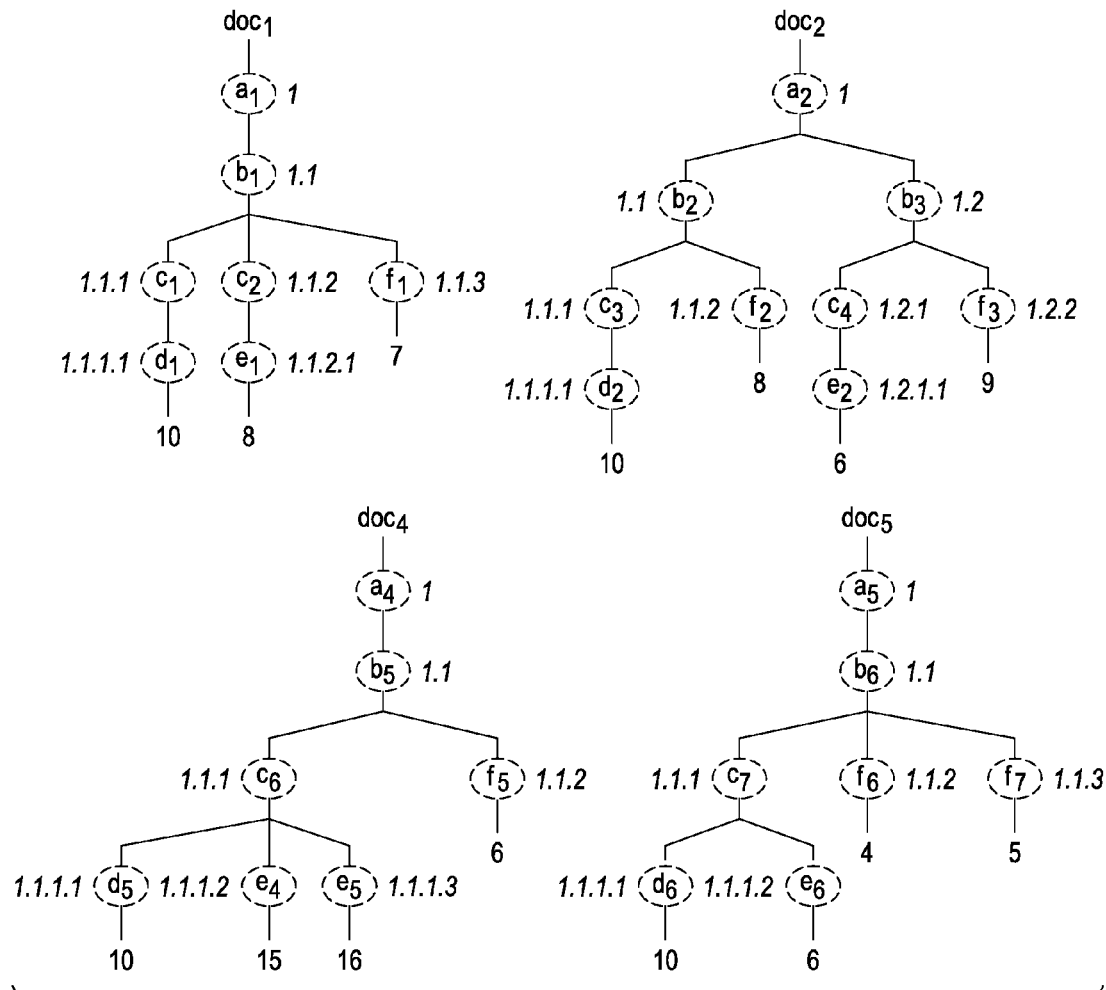
FIG. 9 is an example of tree structure representations of XML documents against which a query, similar to the query in FIG. 7A, is evaluated using the XHashJoin operator in accordance with one illustrative embodiment.

To provide a more concrete example of the way in which the XHashJoin operator works in accordance with one illustrative embodiment, FIG. 9 is provided as an example of tree structure representations of XML documents against which the query in FIG. 7A is evaluated using the XHashJoin operator. As shown in FIG. 9, six example XML documents are illustrated where each document node is associated with a unique ID (e.g., DeweyID) among the document. In the depicted example, the node's ID is a concatenation of its parent node's ID and the node's relative order among siblings. For example, in the first document, the node c1 is the first node among its siblings and the ID for the node b1 is 1.1. Thus, the ID for the node c1 is 1.1.1. Due to this property, the ID for an ancestor node that is k levels above a descendant node can be computed by truncating the last k digits off the descendant node's ID.

FIG. 10 is an exemplary diagram illustrating a data structure of the path indexes on the example XML documents. As shown in FIG. 10, path index maps a linear XPath in XML documents into a unique Path ID. For example, the path /a/b/c/d is mapped to 1 in the depicted example. These path IDs are used in value index data structures associated with XML patterns so as to uniquely identify paths in the XML documents to document nodes of interest, as discussed hereafter. That is, value index data structures for various XML patterns are generated using these path IDs. These value index data structures essentially represent the XML document with regard to the particular XML pattern.

FIG. 11A is an exemplary diagram illustrating a data structure of the value indexes on a "//d" XML pattern. As shown in FIG. 11A, for each document node matching the pattern "//d", there exists an index entry describing the matching document node. This index entry includes an ID 1110 of the path that connects the document root to the document node, a value 1120 of the document node, an ID 1130 of the document (Doc ID) in which the document node is located, and an ID 1140 of the node (node ID). For example, the node d1 in the first document of FIG. 9 satisfies the pattern //d. The node d1 can be reached from the document root via the path /a/b/c/d whose path ID is 1, as shown in FIG. 10. The node d1 has a value of 10 (see FIG. 9) and resides in document 1. The node d1 has a DeweyID of 1.1.1.1. Thus, there is an entry (1, 10, 1, 1.1.1.1) 1150 in the value index for the pattern //d. FIGS. 11B and 11C illustrate similar value indexes defined on the XML patterns //e and //f, respectively, for the documents shown in FIG. 9. Based on these XML value indexes in FIGS. 11A-11C, the concrete example of XHashJoin will now be discussed.

Assuming that the BUILD and PROBE hash tables have been initialized to an empty state, referring again to the query set forth in FIG. 7A, XHashJoin first processes the first leg /a/b/c/d=10 of the query, and populates the BUILD hash table with information from scanning the value indexes in FIGS. 11A-11C. When XHashJoin scans the first index entry (1, 10, 1, 1.1.1.1) in FIG. 11A, the XHashJoin determines that this entry matches the first leg of the query. Thus, the XHashJoin operator computes the location for the BUILD node, node c, by truncating 1 digit off the location for the node d (1.1.1.1) to generate a BUILD node location of 1.1.1. XHashJoin then computes the hash key based on node c1's Doc ID and Node Id, which results in a hash key of 10 in this example. Since the hash bucket indexed by the hash key 10 is empty (the BUILD hash table is empty at the start), XHashJoin creates an entry in the hash table bucket associated with hash key 10 and stores node c's location in the hash table bucket. In addition, since the first leg has one extraction node, i.e. node d, XHashJoin creates a buffer list storing locations for the node d that are under this node c in the document. The newly created buffer list is attached to the entry for this node c.

FIG. 12 is an exemplary diagram of a BUILD hash table data structure 1210 after scanning the first index entry in the example of FIGS. 11A-11C above. In the header 1230 of the buffer list 1220, both pointers are set to NULL. Note that given a hash bucket entry 1230 and its associated buffer lists 1220, the node locations in the buffer lists 1220 always have the same Doc ID as the Doc ID represented by the hash bucket entry 1230. Thus, the Doc IDs for the locations in buffer lists 1220 may be skipped.

Figure 13:
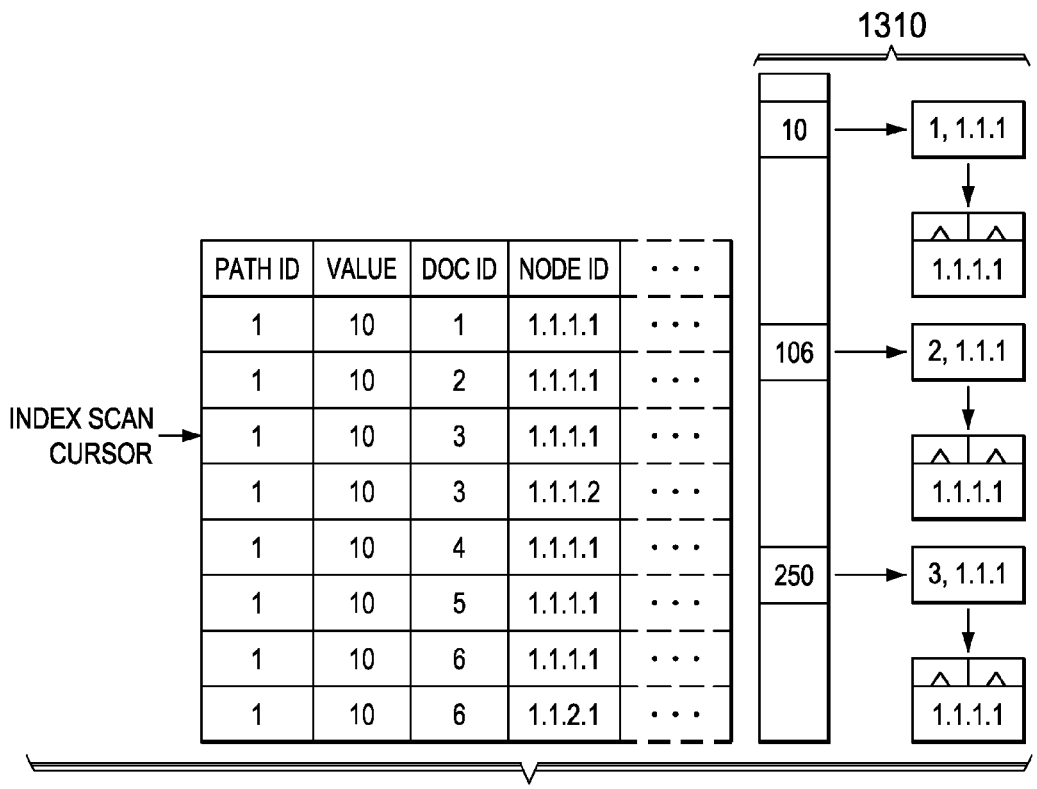
FIG. 13 is an exemplary diagram of the BUILD hash table data structure after processing the third index entry in FIG. 11A.

The second and third index entry of the value index in FIG. 11A are processed in a similar way as the first index entry. FIG. 13 is an exemplary diagram of the BUILD hash table data structure 1310 after processing the third index entry in FIG. 11A.

Figure 14:
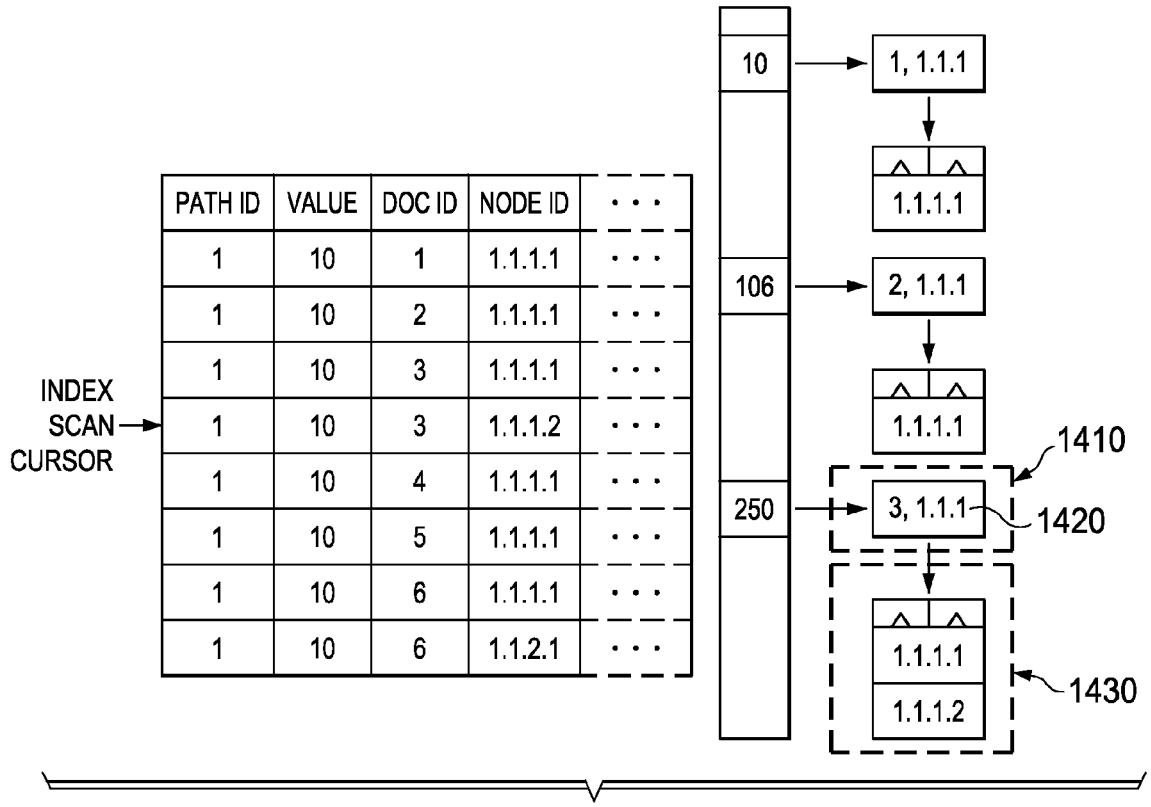
FIG. 14 is an exemplary diagram of the BUILD hash table data structure after processing the fourth index entry in the value index of FIG. 11A.

Referring now to FIG. 14, the index scan cursor then moves to the fourth entry (1, 10, 3, 1.1.1.2) in the value index of FIG. 11A. XHashJoin first computes the location for the BUILD node, which is 1.1.1 with Doc ID 3. XHashJoin then computes the hash key for this node c location, which is 250 in the depicted example. The hash table bucket 1410 indexed by the hash key 250 is non-empty, i.e. it contains an entry 1420 representing a node location 1.1.1 with Doc ID 3. In this case, XHashJoin appends the EXTRACT node location, i.e. 1.1.1.2, at the end of the buffer list 1430 associated with the hash table bucket entry 1410.

Figure 15:
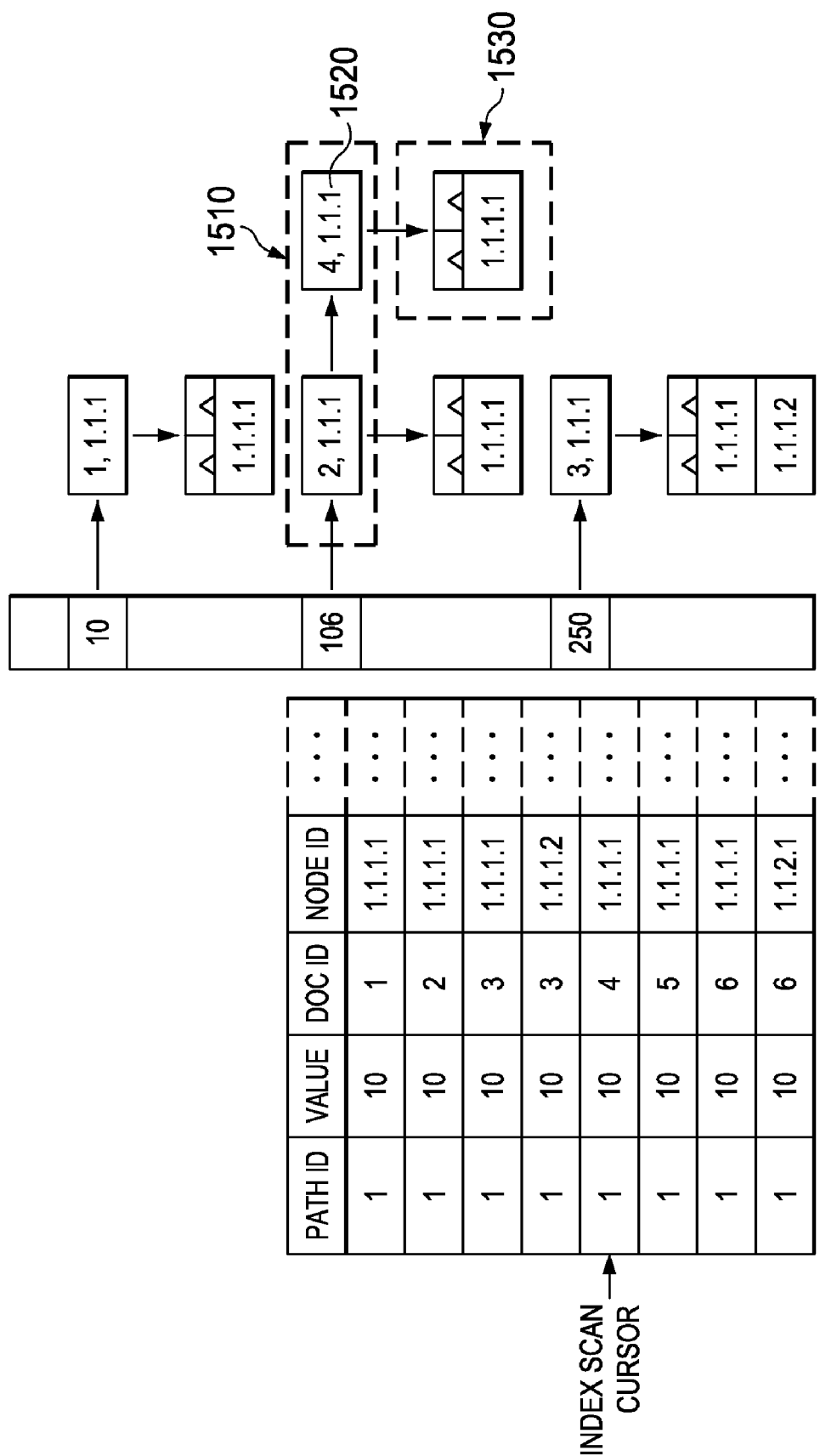
FIG. 15 is an exemplary diagram of a BUILD hash table data structure after processing the fifth index entry in the value index of FIG. 11A.

As shown in FIG. 15, the index scan cursor next moves to the fifth index entry (1, 10, 4, 1.1.1.1) in the value index of FIG. 11A. The XHashJoin operator computes the location for the BUILD node, node c, which is 1.1.1 with Doc ID 4. XHashJoin then computes the hash key for this BUILD node location, which in the depicted example is 106. The hash table bucket 1510 indexed by the hash key 106 is non-empty, but there is no entry in this hash table bucket 1510 representing this BUILD node location. Thus, XHashJoin creates a new entry 1520 to represent this BUILD node location and a buffer list 1530 to store the EXTRACT node location, i.e. 1.1.1.1.

Figure 16:
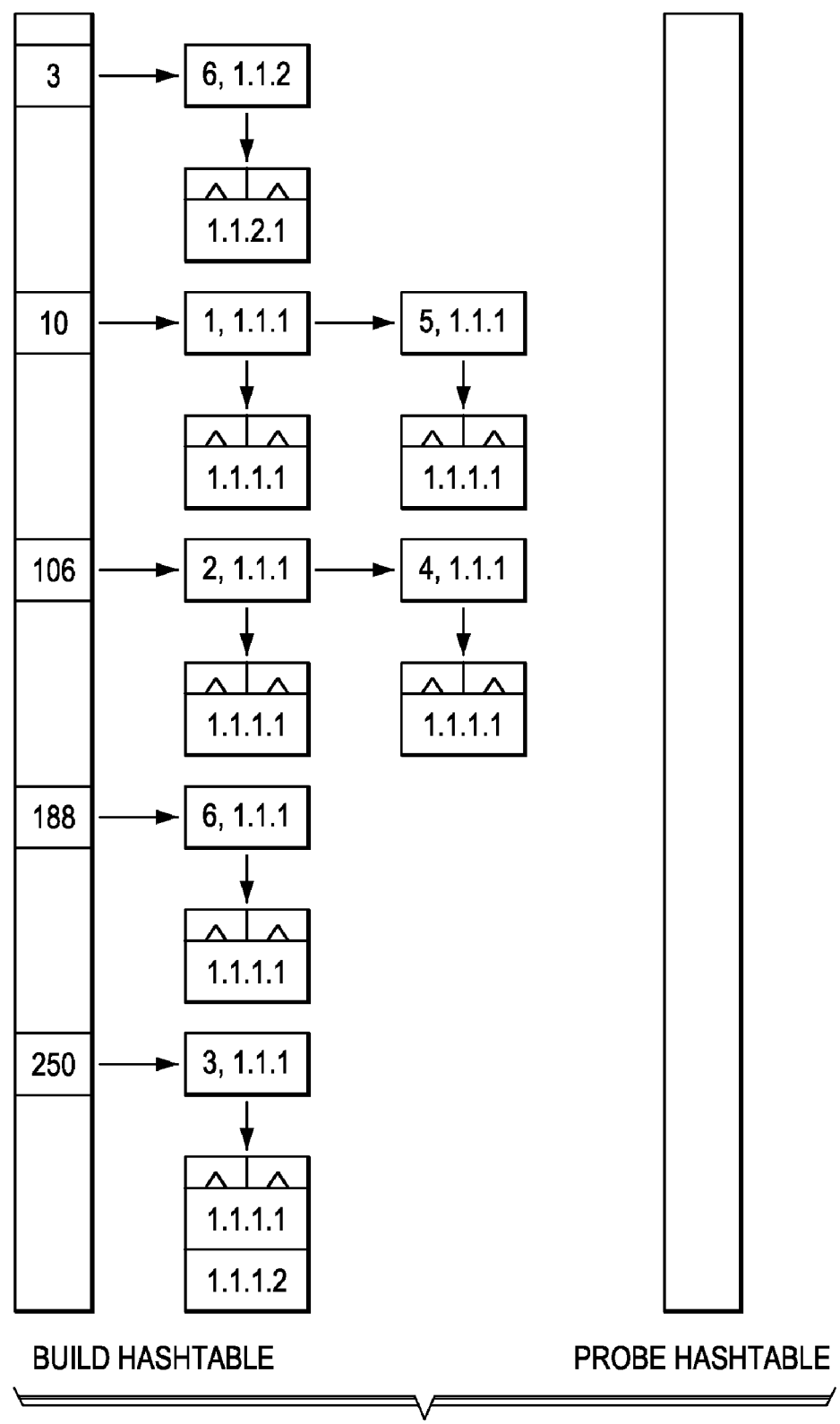
FIG. 16 is an exemplary diagram representing the BUILD and PROBE hash table after processing all the index entries for the first leg of the query in accordance with one illustrative embodiment.

The remaining entries in the value index data structure are processed in a similar fashion for the first leg of the query. FIG. 16 is an exemplary diagram representing the BUILD and PROBE hash table after processing all the index entries for the first leg of the query.

Figure 17:
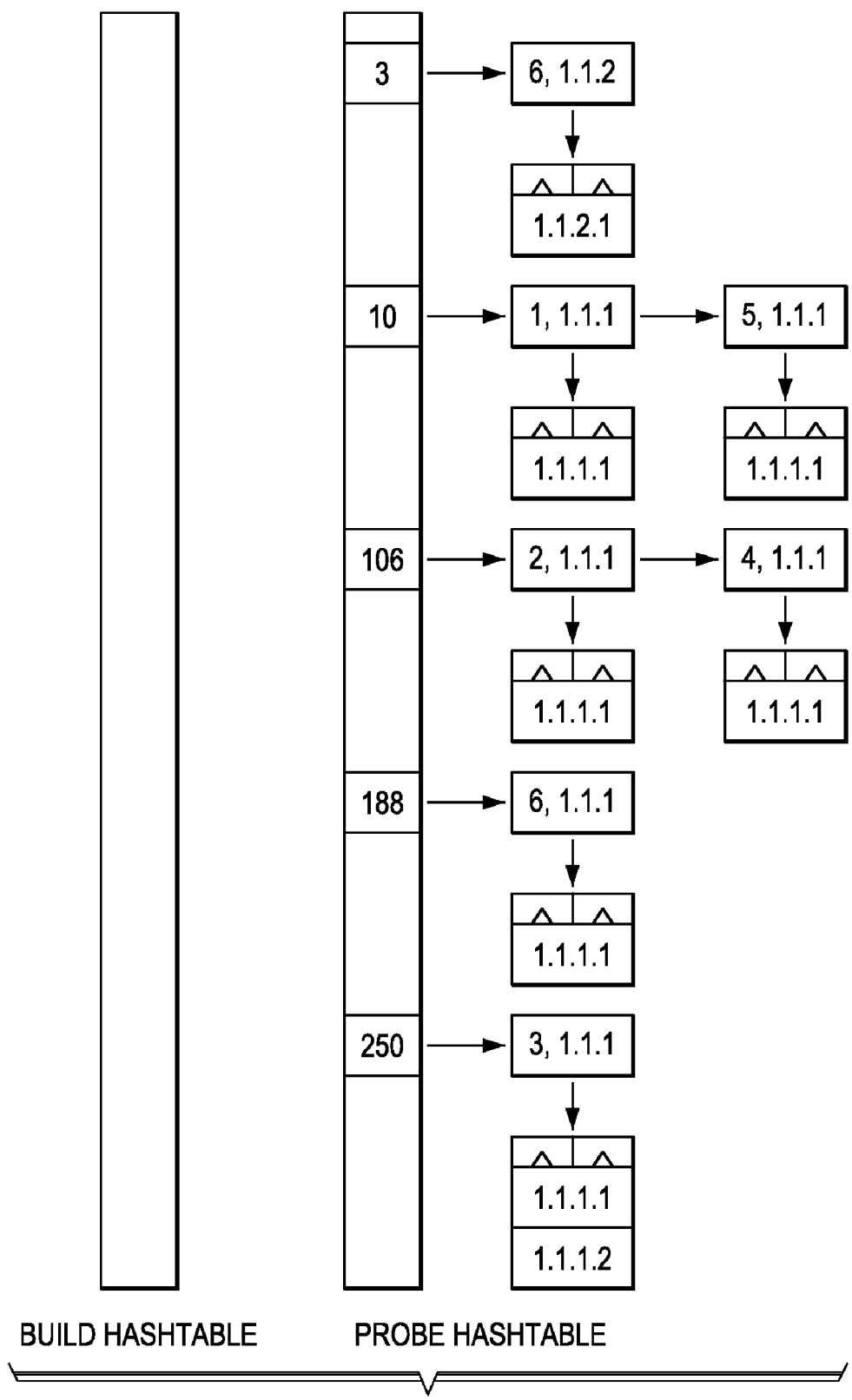
FIG. 17 is an exemplary diagram illustrating the swapping of the BUILD and PROBE hash tables in accordance with one illustrative embodiment.
Figure 18:
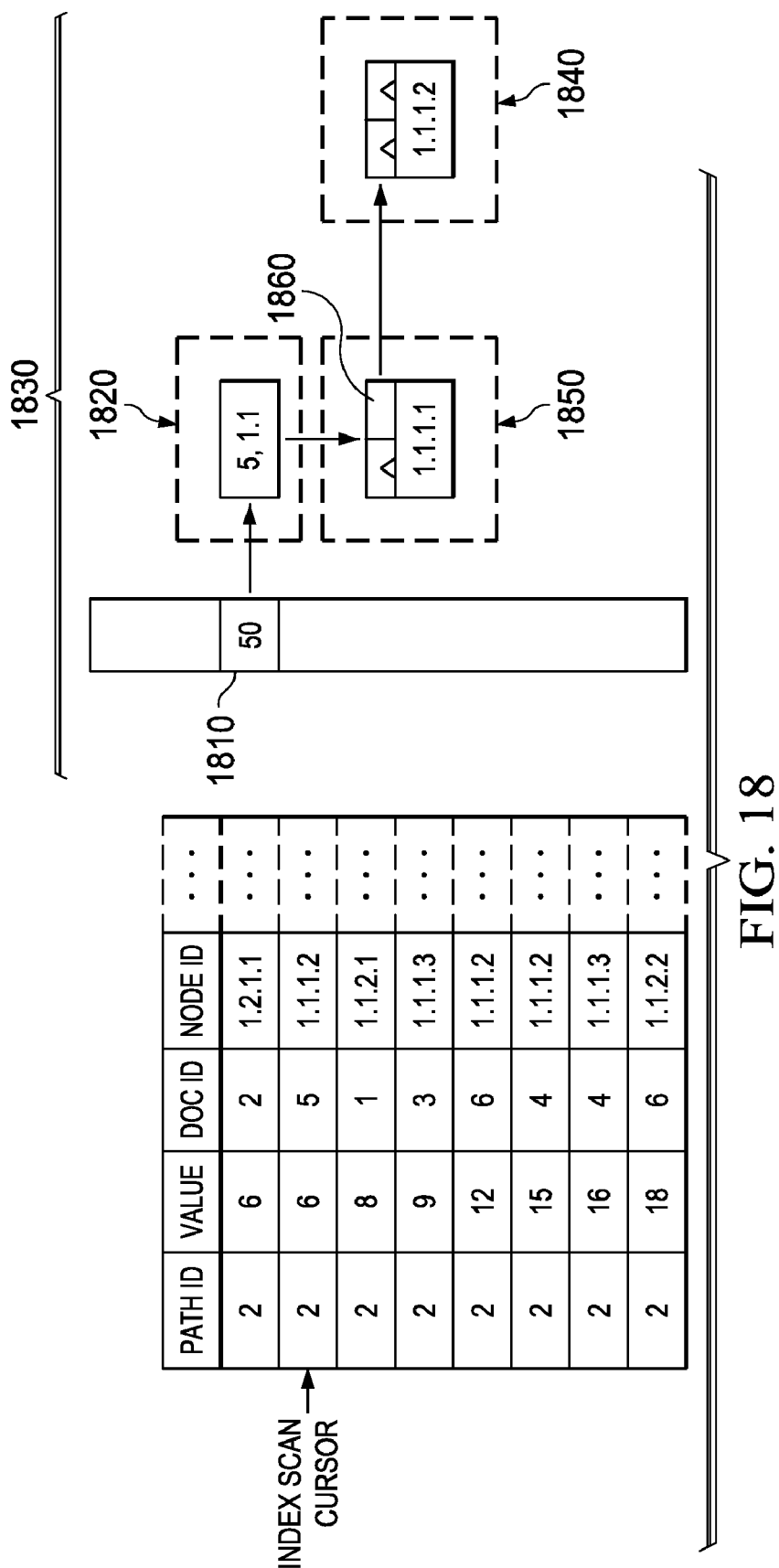
FIG. 18 is an exemplary diagram illustrating processing of a first index entry for a second leg of a query in accordance with one illustrative embodiment.

After all the qualifying index entries for the first leg have been processed, XHashJoin begins processing the index entries for the second leg /a/b/c/e [>5]. XHashJoin first swaps the BUILD and PROBE hash tables as shown in FIG. 17. With reference now to FIG. 18, XHashJoin then processes the first index entry (2, 6, 2, 1.2.1.1) for the second leg. XHashJoin computes the location for the PROBE node of the leg, node c, which is 1.2.1 with Doc ID 2. XHashJoin then probes the PROBE hash table with this PROBE node location. There is no entry in the PROBE hash table representing this location. Thus, XHashJoin skips this index entry and moves on to the second index entry (2, 6, 5, 1.1.1.2). Again, XHashJoin first computes the location for the PROBE node of the second leg, which is 1.1.1 with Doc ID 5, which exists in the PROBE hash table. XHashJoin then computes the location for the BUILD node of the second leg, node b, by truncating two digits off the node e's ID 1.1.1.2 since node b is two levels above node e. That is, the BUILD node location is 1.1 with Doc ID 5.

XHashJoin next computes the hash key 1810 for this BUILD node location, which in the depicted example is 50. Since the hash table bucket 1820 indexed by 50 in the BUILD hash table 1830 is empty, XHashJoin creates an entry storing the PROBE node location (5, 1.1.1) to this new entry 1820 in the BUILD hash table 1830. Finally, since the second leg has an extraction node, node e, XHashJoin creates a new buffer list 1840 to store this EXTRACT node location and links this newly created buffer list 1840 with the existing buffer list 1850 through buffer list head pointers 1860.

Figure 19:
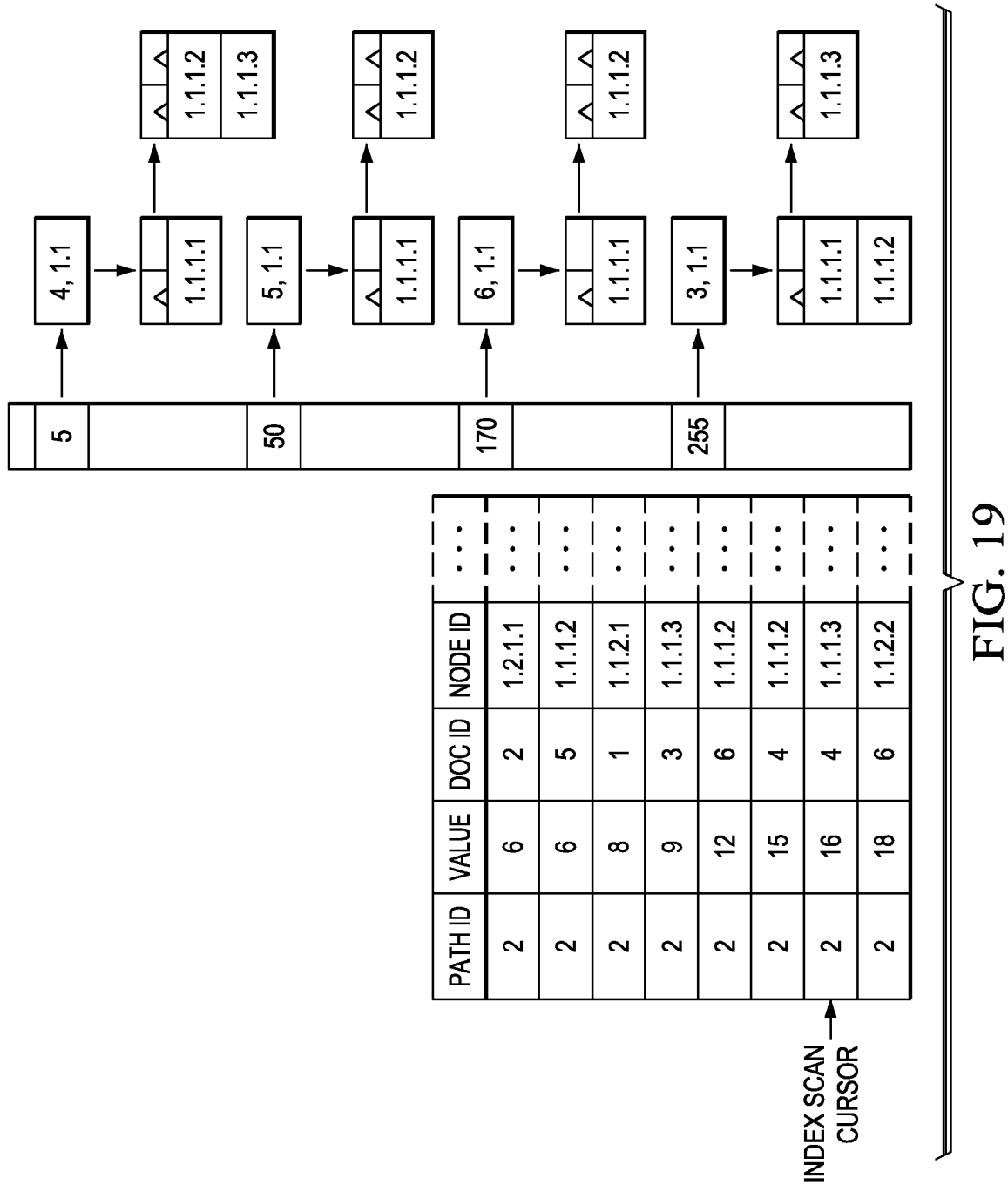
FIG. 19 is an exemplary diagram illustrating the BUILD hash table after processing the value index entry before the last value index entry in accordance with one illustrative embodiment.

The rest of the value index entries are processed in a similar manner for the second leg of the query. FIG. 19 is an exemplary diagram illustrating the BUILD hash table after processing the value index entry before the last value index entry.

Figure 20:
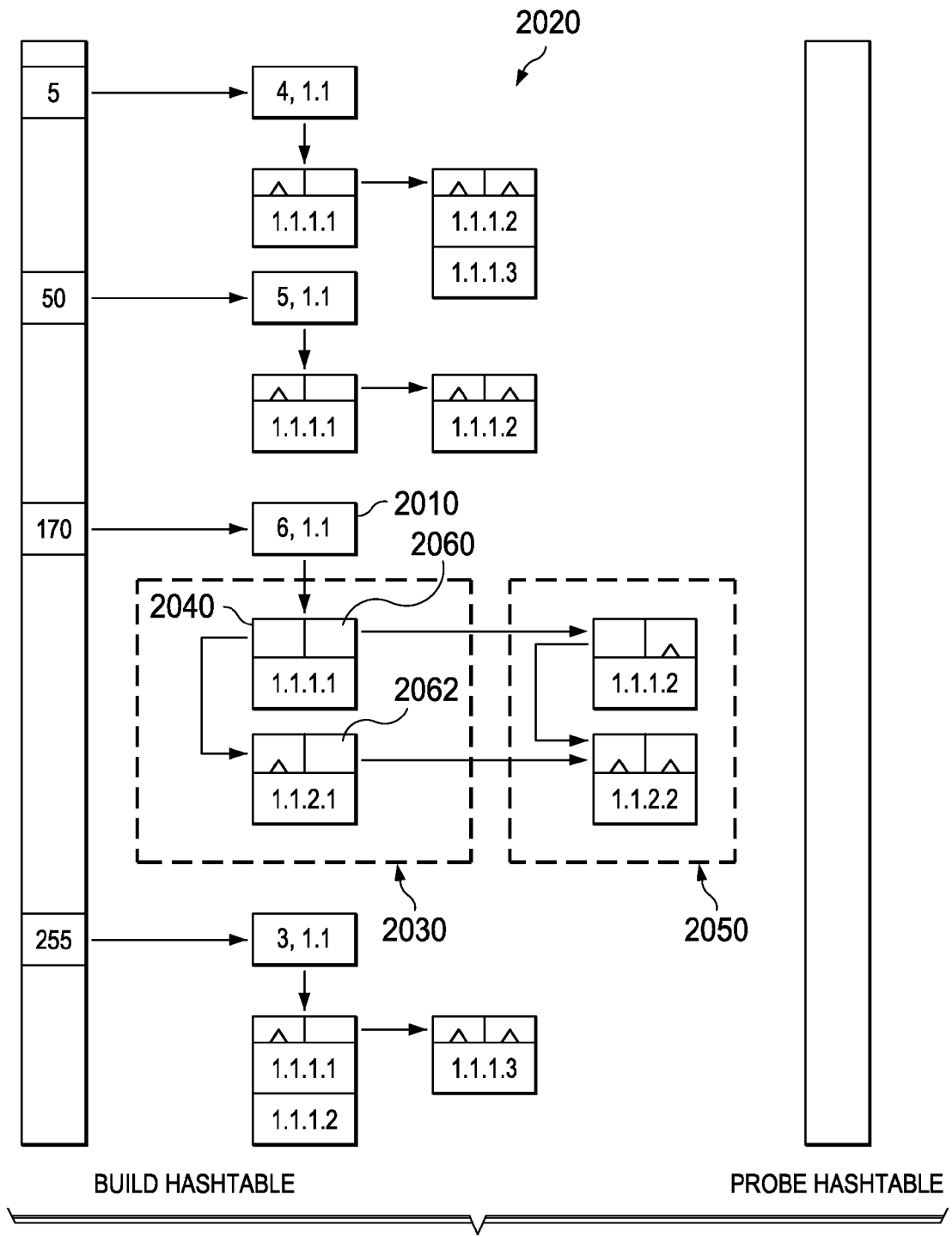
FIG. 20 is an exemplary diagram illustrating the processing of a last value index entry for the second leg of the query in accordance with one illustrative embodiment.

With reference now to FIG. 20, the XHashJoin operator moves on to process the last value index entry (2, 18, 6, 1.1.2.2) for the second leg of the query. XHashJoin first computes the PROBE node location, i.e. 1.1.2 with Doc ID 6, which exists in the PROBE hash table (see FIG. 17). XHashJoin then computes the BUILD node location, which is 1.1 with the Doc ID 6. There is already an entry 2010 in the BUILD hash table 2020 representing this location. This entry 2010 contains a buffer list 2030 for the first extraction node storing a document node location 1.1.1.1. The corresponding entry (6, 1.1.2) in the PROBE hash table (see FIG. 17) contains a buffer list storing a node location 1.1.2.1 for the first extraction node. These two node locations are for the same EXTRACT node but are under different PROBE node locations: the PROBE node location for the former is 1.1.1 while the PROBE node location for the latter is 1.1.2. Thus, from the hash value 170→(6,1.1) in FIG. 19, the buffer list storing the node location 1.1.1.1 from the BUILD hash table is linked to the buffer list storing the node location 1.1.2.1 from the PROBE hash table (see FIG. 17) through the former list's left header pointer 2040. Furthermore, the EXTRACT node location from this index entry 1.1.2.2 and the existing buffered node location 1.1.1.2 for the same EXTRACT node are under different PROBE node locations. Thus, XHashJoin creates a new buffer list 2050 storing this location 1.1.2.2 and sets the left pointer 2052 in the existing buffered node location 1.1.1.2 to this newly created buffer list 2050. Finally, since the node location 1.1.2.1 in the buffer list and the node location 1.1.2.2 in the buffer list are under the same PROBE node location 1.1.2, the right pointer 2060-2062 of the buffer list 2040 points to the buffer list 2050.

Figure 21:
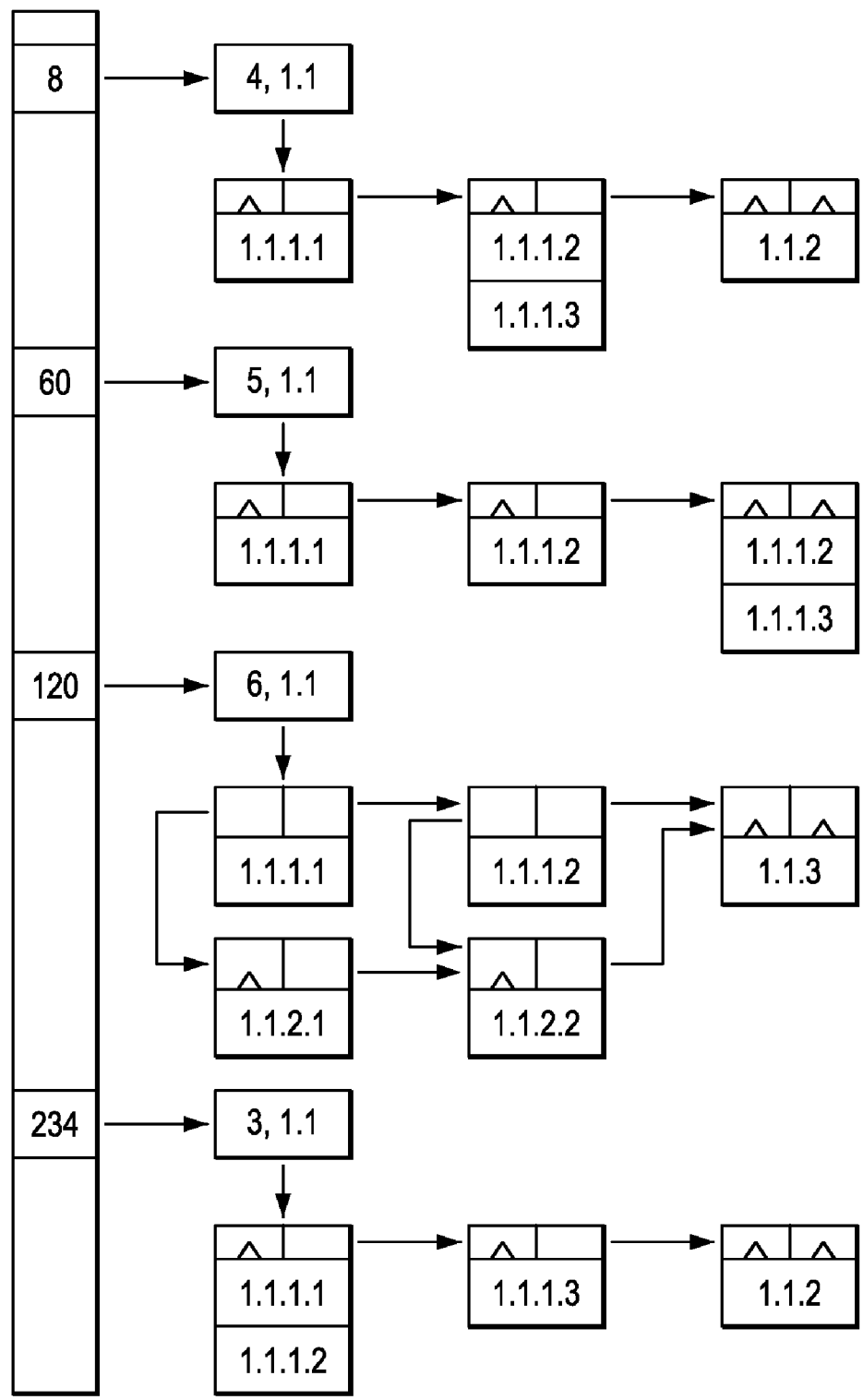
FIG. 21 presents the BUILD hash table after all qualifying index entries for the third leg have been processed in accordance with one illustrative embodiment.

The last leg /z/b/f[.<16] can be processed in a similar way as the second leg by considering the query node f as both the PROBE and the BUILD node. FIG. 21 presents the BUILD hash table after all qualifying index entries for the third leg have been processed.

Figure 22:
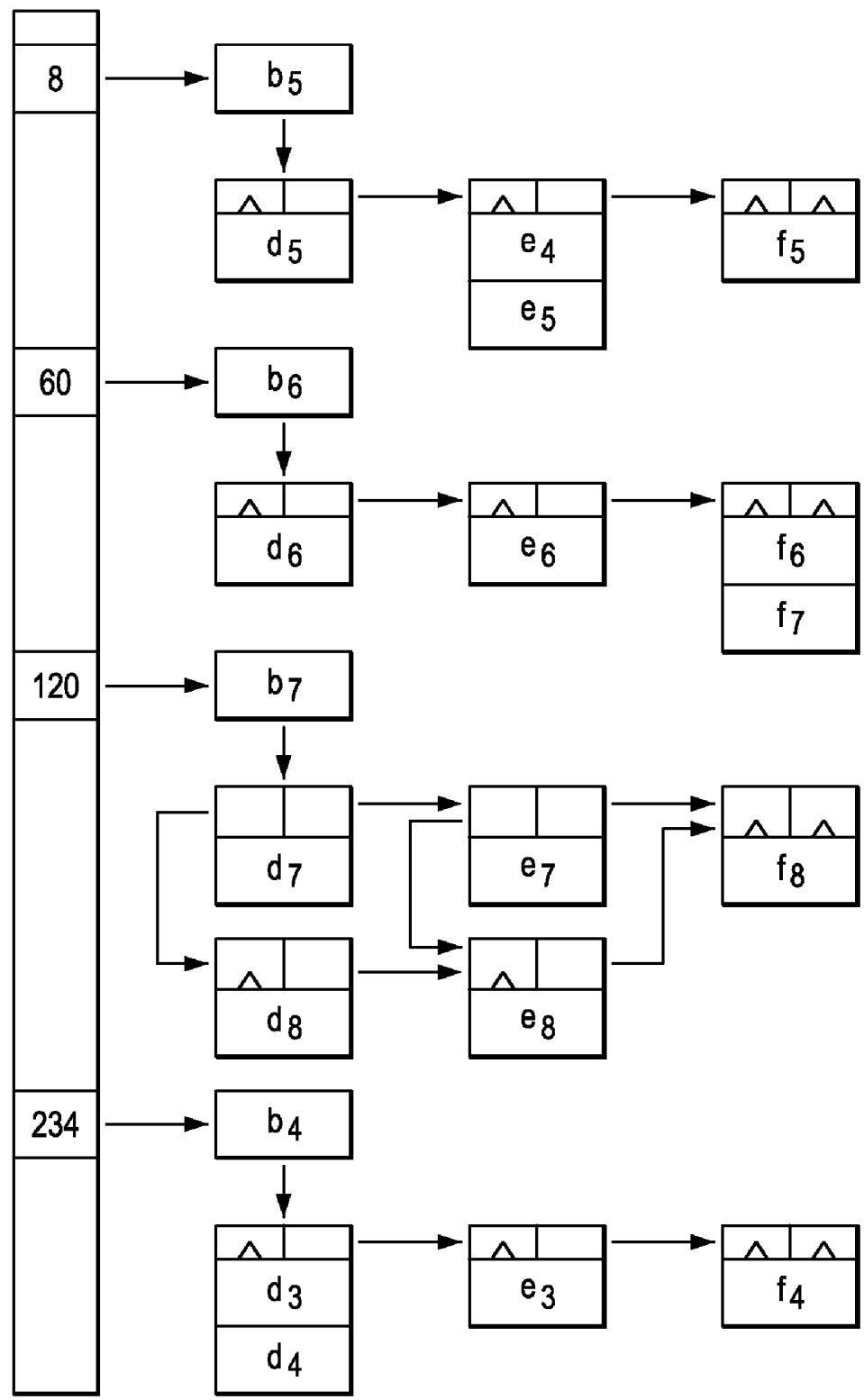
FIG. 22 is an exemplary diagram illustrating the replacement of document node locations with actual nodes in the BUILD hash table for discussion purposes within the detailed description.

To simplify the discussion of the result construction, consider the document node locations as being replaced with the actual nodes in the BUILD hash table as shown in FIG. 22. After all the legs have been processed, XHashJoin visits each entry in the BUILD hash table, composes query results by combining document nodes in buffer lists that are chained through right head pointers based on the FOR/LET semantics. If a buffer list is for a FOR extraction node, then each node in the buffer list will be used individually for composing a result. If a buffer list is for a LET extraction node, then all the nodes in the buffer list will use a single sequence for composing a result. For example, for the sample query in FIG. 7A, since all the extraction nodes, i.e. $d, $e, and $f, are of FOR semantics, results are constructed by outputting the Cartesian products of the nodes in the buffer lists interconnected by right head pointers. That is, the query results are:

{d5, e4, f5} and {d5, e5, f5} from the entry b5;
{d6, e6, f6} and {d6, e6, f7} from the entry b6;
{d7, e7, f8} and {d8, e8, f8} from the entry b7; and
{d3, e3, f4} and {d4, e3, f4} from the entry b4.

More specifically, the following results will be returned:

Result 1: <res><d5>10</d5><e4>15</e4><f5>6</f5></res>
Result 2: <res><d5>10</d5><e5>16</e5><f5>6</f5></res>
Result 3: <res><d6>10</d6><e6>6</e6><f6>4</f6></res>
Result 4: <res><d6>10</d6><e6>6</e6><f7>5</f7></res>
Result 5: <res><d7>10</d7><e7>12</e7><f8>6</f8></res>
Result 6: <res><d8>10</d8><e8>18</e8><f8>6</f8></res>
Result 7: <res><d3>10</d3><e3>9</e3><f4>7</f4></res>
Result 8: <res><d4>10</d4><e3>9</e3><f4>7</f4></res>

FIG. 23 shows a sample query containing a LET extraction nodes, $f. Given this query, and the sample documents and indexes in FIGS. 9 and 11A-11C, the BUILD hash table after processing all the query legs will the same as that shown in FIG. 22. Since the extraction node $f is of LET semantics, the document nodes in the buffer lists representing $f should be used as a single sequence. Thus, the results for this query are:

{d5, e4, f5} and {d5, e5, f5} from the entry b5;
{d6, e6, {f6, f7} } from the entry b6;
{d7, e7, f8} and {d8, e8, f8} from the entry b7; and
{d3, e3, f4} and {d4, e3, f4} from the entry b4.

Note: more specifically, the following results will be returned;

Result 1: <res><d5>10</d5><e4>15</e4><f5>6</f5></res>
Result 2: <res><d5>10</d5><e5>16</e5><f5>6</f5></res>
Result 3: <res><d6>10</d6><e6>6</e6><f6>4</f6><f7>5</f7></res>
Result 4: <res><d7>10</d7><e7>12</e7><f8>6</f8></res>
Result 5: <res><d8>10</d8><e8>18</e8><f8>6</f8></res>
Result 6: <res><d3>10</d3><e3>9</e3><f4>7</f4></res>
Result 7: <res><d4>10</d4><e3>9</e3><f4>7</f4></res>

Based on the results of the query, document nodes matching the query are provided to the originator of the query. These document nodes may then be used to display query results to a user, access corresponding documents associated with the document nodes, or the like. The various types of functions or operations that may be performed based on query results are varied depending upon the particular implementation.

Thus, the illustrative embodiment provide an apparatus and method for performing a markup language node level hash join for evaluating a query language query are provided. The markup language node level hash join mechanism, i.e. the "XHashJoin" operator, is a multi-way join operator that uses two hash tables, BUILD and PROBE, to intersect document nodes from multiple index scans and to buffer intermediate query results. The BUILD hash table stores document nodes matching the predicates of a query, and buffers document nodes satisfying extraction nodes, of each portion of the query up to a current portion of the query being evaluated. The BUILD hash table and the PROBE hash table are switched at each portion of the query being evaluated. Query results are generated by linking document nodes buffered in the BUILD hash table based on the semantics of each extraction node.

FIG. 24 is an illustrative functional block diagram of a query evaluation engine in accordance with one illustrative embodiment. The elements shown in FIG. 24 may be implemented in hardware, software, or any combination of hardware and software. In one illustrative embodiment, the elements in FIG. 24 are implemented as software instructions executed on one or more data processing devices, e.g., processors, in a data processing system.

As shown in FIG. 24, the query evaluation engine 2400 comprises a controller 2410, an interface 2420, a document index interface 2430, a query division engine 2440, a document index scanning engine 2450, a hash table engine 2460, and a result generation engine 2470. The controller 2410 controls the overall operation of the query evaluation engine 2400 and orchestrates the operation of the other elements. The interface 2420 is a communication interface through which queries may be received and results of the running of the queries on documents in a document database may be returned. The document index interface 2430 is a communication interface through which a query evaluation engine 2400 may access document indexes stored in association with the document database.

The query division engine 2440 performs the operations discussed above with regard to separating received queries into legs for use in processing document indexes. The document index scanning engine 2450 scans the document indices based on the various legs of the queries in the manner discussed above to generate entries in the hash tables and their associated buffer lists as described in detail above. The hash table engine 2460 is used to generate hash table keys for accessing the hash tables, e.g., the BUILD and PROBE hash tables, for purposes of determining if the hash table has an existing entry and/or for purposes of generating new entries in the hash tables and buffer lists in the manner previously described above. The results generation engine 2470 generates results for the received queries based on the entries in the BUILD hash table in the manner discussed above. These results may be returned to the originators of the queries via the interface 2420.

Thus, the illustrative embodiments provide mechanisms for evaluating queries which, when compared to existing index based query evaluation techniques, fully utilizes indexes for evaluating queries and avoids navigations for predicate re-evaluation. Moreover, the illustrative embodiments support queries with both equality and range value predicates. Furthermore, the illustrative embodiments support queries with multiple extraction points and FOR/LET semantics in XQuery. XHashJoin also is false-positive free and is a multi-way node level join operator.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for evaluating an electronic document query, comprising:
receiving a hierarchical query;
separating the hierarchical query into a plurality of query legs;
performing an index scan for evaluating the hierarchical query against at least one index of at least one hierarchically structured electronic document by processing a query leg on the at least one index of the at least one hierarchically structured electronic document to determine if a condition of the query leg is met by at least one node in the at least one index of the at least one hierarchically structured electronic document, wherein if at least one node in the at least one index of the at least one hierarchically structured electronic document satisfies the condition of the query leg, an entry in at least one hash table is populated with information regarding the at least one node;
generating results of the hierarchical query based on content of the at least one hash table; and
returning the results of the hierarchical query to an originator of the hierarchical query, wherein the at least one hash table comprises a BUILD hash table and a PROBE hash table, wherein the BUILD hash table is used to store document nodes matching a predicate of the query leg and to buffer document nodes satisfying extraction nodes of the query leg, and wherein the PROBE hash table stores document nodes satisfying predicates from query legs evaluated prior to a current query leg being evaluated.

2. The method of claim 1, wherein the hierarchical query is an Extensible Markup Language (XML) Query (XQuery) having at least one FOR, LET, WHERE, ORDER BY, and RETURN (FLWOR) expression.

3. The method of claim 1, wherein performing the index scan is performed for each query leg of the plurality of query legs, and wherein results of the index scans of the plurality of query legs are joined using at least one hierarchical multi-way hash join operation that operates on the BUILD hash table and the PROBE hash table.

4. The method of claim 3, wherein collisions encountered by the at least one multi-way hash join operations are resolved by buffering up document nodes having a specific hash value.

5. The method of claim 1, wherein performing the index scan is performed for each query leg of the plurality of query legs sequentially, and wherein the PROBE hash table and the BUILD hash table are switched with each subsequent index scan for each subsequent query leg.

6. The method of claim 1, wherein generating results comprises linking document nodes buffered in the BUILD hash table based on the semantics of each extraction node in the hierarchical query.

7. The method of claim 1, wherein the BUILD hash table and the PROBE hash table preserve a structure of intermediate results of evaluating the hierarchical query.

8. The method of claim 1, wherein the BUILD hash table buffers document nodes satisfying extraction nodes of the query leg in at least one buffer list having a first pointer that points to a next buffer list for a same extraction node and a second pointer that points to a buffer list for the next extraction node.

9. The method of claim 8, wherein generating results of the hierarchical query based on content of the at least one hash table comprises combining document nodes in the at least one buffer list that are interconnected by the second pointers of the at least one buffer list.

10. The method of claim 1, wherein each query leg is a linear hierarchy.

11. The method of claim 1, wherein each query leg comprises one or more BUILD nodes and one or more PROBE nodes, wherein a query leg's BUILD node is a lowest common ancestor node between the query leg and its right neighboring query leg, and wherein a query leg's PROBE node is a lowest common ancestor node between the query leg and its left neighboring query leg.

12. The method of claim 11, wherein performing an index scan comprises:
for each qualified index entry in the at least one index of the at least one hierarchically structured electronic document, using a document node matching the query leg's PROBE node to perform a lookup operation on the PROBE hash table;
determining if the lookup operation is successful;
adding the document node matching the query leg's BUILD node into the BUILD hash table in response to a determination that the lookup operation is successful;
buffering, if a current query leg contains an EXTRACT node, a document node matching the query leg's EXTRACT node in the BUILD hash table in addition to document nodes matching EXTRACT nodes in previously evaluated query legs; and
linking document nodes matching EXTRACT nodes of query legs up to the current query leg based on structural relationships.

13. A computer program product comprising a computer recordable medium having a computer readable program recorded thereon, wherein the computer readable program, when executed on a computing device, causes the computing device to:
receive a hierarchical query;
separate the hierarchical query into a plurality of query legs;
perform an index scan for evaluating the hierarchical query against at least one index of at least one hierarchically structured electronic document by processing a query leg on the at least one index of the at least one hierarchically structured electronic document to determine if a condition of the query leg is met by at least one node in the at least one index of the at least one hierarchically structured electronic document, wherein if at least one node in the at least one index of the at least one hierarchically structured electronic document satisfies the condition of the query leg, an entry in at least one hash table is populated with information regarding the at least one node;
generate results of the hierarchical query based on content of the at least one hash table; and
return the results of the hierarchical query to an originator of the hierarchical query, wherein the at least one hash table comprises a BUILD hash table and a PROBE hash table, wherein the BUILD hash table is used to store document nodes matching a predicate of the query leg and to buffer document nodes satisfying extraction nodes of the query leg, and wherein the PROBE hash table stores document nodes satisfying predicates from query legs evaluated prior to a current query leg being evaluated.

14. The computer program product of claim 13, wherein the hierarchical query is an Extensible Markup Language (XML) Query (XQuery) having at least one FOR, LET, WHERE, ORDER BY, and RETURN (FLWOR) expression.

15. The computer program product of claim 13, wherein the computer readable program causes the computing device to perform the index scan for each query leg of the plurality of query legs, and wherein results of the index scans of the plurality of query legs are joined using at least one hierarchical multi-way hash join operation that operates on the BUILD hash table and the PROBE hash table.

16. The computer program product of claim 15, wherein collisions encountered by the at least one multi-way hash join operation are resolved by buffering up document nodes having a specific hash value.

17. The computer program product of claim 13, wherein the computer readable program causes the computing device to perform the index scan for each query leg of the plurality of query legs sequentially, and wherein the PROBE hash table and the BUILD hash table are switched with each subsequent index scan for each subsequent query leg.

18. The computer program product of claim 13, wherein the computer readable program causes the computing device to generate results by linking document nodes buffered in the BUILD hash table based on semantics of each extraction node in the query.

19. The computer program product of claim 13, wherein each query leg is a linear hierarchy.

20. The computer program product of claim 13, wherein each query leg comprises one or more BUILD nodes and one or more PROBE nodes, wherein a query leg's BUILD node is a lowest common ancestor node between the query leg and its right neighboring query leg, and wherein a query leg's PROBE node is a lowest common ancestor node between the query leg and its left neighboring query leg.

21. The computer program product of claim 20, wherein the computer readable program causes the computing device to perform an index scan by:
for each qualified index entry in the at least one index of the at least one hierarchically structured electronic document, using a document node matching the query leg's PROBE node to perform a lookup operation on the PROBE hash table;

determining if the lookup operation is successful;

adding the document node matching the query leg's BUILD node into the BUILD hash table in response to a determination that the lookup operation is successful;

buffering, if a current query leg contains an EXTRACT node, a document node matching the query leg's EXTRACT node in the BUILD hash table in addition to document nodes matching EXTRACT nodes in previously evaluated query legs; and linking document nodes matching EXTRACT nodes of query legs up to the current query leg based on structural relationships.

22. The computer program product of claim 13, wherein the BUILD hash table and the PROBE hash table preserve a structure of intermediate results of evaluating the query.

23. An apparatus, comprising:

a processor; and a memory coupled to the processor, wherein the memory comprises instructions which, when executed by the processor, cause the processor to:

receive a hierarchical query;

separate the hierarchical query into a plurality of query legs;

perform an index scan for evaluating the hierarchical query against at least one index of at least one hierarchically structured electronic document by processing a query leg on the at least one index of the at least one hierarchically structured electronic document to determine if a condition of the query leg is met by at least one node in the at least one index of the at least one hierarchically structured electronic document, wherein if at least one node in the at least one index of the at least one hierarchically structured electronic document satisfies the condition of the query leg, an entry in at least one hash table is populated with information regarding the at least one node;

generate results of the hierarchical query based on content of the at least one hash table; and return the results of the hierarchical query to an originator of the hierarchical query, wherein the at least one hash table comprises a BUILD hash table and a PROBE hash table, wherein the BUILD hash table is used to store document nodes matching a predicate of the query leg and to buffer document nodes satisfying extraction nodes of the query leg, and wherein the PROBE hash table stores document nodes satisfying predicates from query legs evaluated prior to a current query leg being evaluated.

* * * * *